(12) United States Patent
Song et al.

(10) Patent No.: US 12,313,734 B2
(45) Date of Patent: May 27, 2025

(54) SIGNAL TRANSMISSION METHOD AND APPARATUS

(71) Applicant: SHENZHEN YINWANG INTELLIGENT TECHNOLOGIES CO., LTD, Shenzhen (CN)

(72) Inventors: Sida Song, Beijing (CN); Sha Ma, Beijing (CN); Qian Wu, Beijing (CN); Lei Gao, Beijing (CN)

(73) Assignee: SHENZHEN YINWANG INTELLIGENT TECHNOLOGIES CO., LTD., Shenzhen (CN)

( * ) Notice: Subject to any disclaimer, the term of this patent is extended or adjusted under 35 U.S.C. 154(b) by 517 days.

(21) Appl. No.: 17/673,159

(22) Filed: Feb. 16, 2022

(65) Prior Publication Data

US 2022/0171055 A1   Jun. 2, 2022

Related U.S. Application Data

(63) Continuation of application No. PCT/CN2020/109200, filed on Aug. 14, 2020.

(30) Foreign Application Priority Data

Aug. 16, 2019 (CN) .......................... 201910766375.1

(51) Int. Cl.
| | | |
|---|---|---|
| *G01S 13/931* | (2020.01) | |
| *G01S 7/02* | (2006.01) | |
| *G01S 7/52* | (2006.01) | |
| *G01S 7/36* | (2006.01) | |
| *G01S 13/88* | (2006.01) | |

(52) U.S. Cl.
CPC ............ *G01S 13/931* (2013.01); *G01S 7/021* (2013.01); *G01S 7/52092* (2013.01)

(58) Field of Classification Search
CPC .... G01S 13/931; G01S 7/021; G01S 7/52092; G01S 7/023; G01S 7/35; G01S 13/00;
(Continued)

(56) References Cited

U.S. PATENT DOCUMENTS

| | | | | |
|---|---|---|---|---|
| 5,428,819 A | * | 6/1995 | Wang ..................... | H04W 16/14 455/67.11 |
| 2012/0208582 A1 | * | 8/2012 | Kang ..................... | H04W 16/14 455/509 |

(Continued)

FOREIGN PATENT DOCUMENTS

| | | |
|---|---|---|
| CN | 1101470 A | 4/1995 |
| CN | 101572683 A | 11/2009 |

(Continued)

*Primary Examiner* — Vladimir Magloire
*Assistant Examiner* — Remash R Guyah
(74) *Attorney, Agent, or Firm* — Conley Rose, P.C.

(57) ABSTRACT

A signal transmission method includes a radar detection apparatus selecting a transmit frequency band from a pre-defined or pre-specified first frequency band. The first frequency band is pre-divided into M sub-frequency bands, and the transmit frequency band includes N sub-frequency bands in the M sub-frequency bands, where a bandwidth of the transmit frequency band is greater than or equal to an operating bandwidth of the radar detection apparatus. A sum of bandwidths of any N−1 sub-frequency bands in the N sub-frequency bands is less than the operating bandwidth of the radar detection apparatus. In addition, a minimum quantity of sub-frequency bands is used to transmit a signal.

21 Claims, 18 Drawing Sheets

(58) Field of Classification Search
CPC ...... G01S 7/0232; G01S 7/0236; G01S 7/032; G01S 7/036; G01S 7/40; G01S 13/34; G01S 13/343; G01S 13/426; G01S 13/86; G01S 2013/0254; G01S 7/41; G01S 13/88; G01S 13/881; H04B 1/00; H04W 16/14
USPC ................. 342/70, 21, 82, 175, 173; 455/73
See application file for complete search history.

(56) References Cited

U.S. PATENT DOCUMENTS

| | | | |
|---|---|---|---|
| 2015/0168546 A1* | 6/2015 | Nakagawa | G01S 13/931 342/21 |
| 2016/0157103 A1* | 6/2016 | Teng | H04W 72/541 370/329 |
| 2016/0277166 A1 | 9/2016 | Liu | |
| 2018/0019797 A1 | 1/2018 | Khan et al. | |
| 2019/0056476 A1* | 2/2019 | Lin | G01S 7/021 |
| 2019/0377077 A1* | 12/2019 | Kitayama | G01S 7/0232 |

FOREIGN PATENT DOCUMENTS

| | | | | |
|---|---|---|---|---|
| CN | 103096331 A | | 5/2013 | |
| CN | 103477598 A | * | 12/2013 | ......... H04L 27/2626 |
| CN | 103477598 B | * | 12/2013 | ............. H04L 27/26 |
| CN | 105553631 A | | 5/2016 | |
| CN | 109152051 A | * | 1/2019 | ........... H04L 5/0005 |
| CN | 105594240 B | | 6/2019 | |
| EP | 3502732 A1 | | 6/2019 | |

\* cited by examiner

SIGNAL TRANSMISSION METHOD AND APPARATUS

CROSS-REFERENCE TO RELATED APPLICATIONS

This is a continuation of International Patent Application No. PCT/CN2020/109200 filed on Aug. 14, 2020, which claims priority to Chinese Patent Application No. 201910766375.1 filed on Aug. 16, 2019. The disclosures of the aforementioned applications are hereby incorporated by reference in their entireties.

TECHNICAL FIELD

This application relates to the autonomous driving field, and in particular, to a signal transmission method and apparatus.

BACKGROUND

As the society develops, more and more machines in modern life are developing toward automation and intelligence, and mobile vehicles are no exception. Intelligent vehicles are gradually entering people's daily lives. In recent years, an advanced driving assistant system (ADAS) has played an important role in the intelligent vehicles. The system uses various sensors installed on a vehicle to sense a surrounding environment, collect data, and identify, detect, and track static and moving objects during a driving process. The system performs calculation and analysis based on navigation map data. In this way, a driver can foresee possible danger in advance. This effectively improves comfort and safety of driving.

In an unmanned driving architecture, a sensing layer includes a vision sensor such as a vehicle-mounted camera, and a radar sensor such as a vehicle-mounted millimeter-wave radar, a vehicle-mounted laser radar, and a vehicle-mounted ultrasonic radar. A millimeter-wave radar is the first to become a main sensor in an unmanned driving system due to cost-effectiveness and mature technologies. Currently, the ADAS has developed more than 10 functions, including adaptive cruise control (ACC), automatic emergency braking or autonomous emergency braking (AEB), lane change assist (LCA), blind spot monitoring (BSM) and the like, which are inseparable from the vehicle-mounted millimeter-wave radar. A millimeter wave is an electromagnetic wave with a wavelength ranging from 1 millimeter (mm) to 10 mm, and a corresponding frequency range is 30 gigahertz (GHz) to 300 GHz. In this frequency band, millimeter wave-related features make the millimeter wave ideally suitable for the vehicle-mounted field. For example, the millimeter wave-related features are as follows: large bandwidth: An abundant frequency domain resource, and a low antenna side lobe are conducive to implementation of imaging or quasi-imaging. Short wavelength: A volume of a radar device and a diameter of antenna are reduced, and hence weight is reduced. Narrow beam: In the same antenna size, a millimeter wave beam is much narrower than a microwave beam, and radar resolution is high. Strong penetration: Compared with laser radar and an optical system, a millimeter-wave radar is more capable of penetrating smoke, dust, and fog, and can work around the clock.

A waveform of a transmit signal of the millimeter-wave radar includes a continuous wave, a pulse wave, or the like. The transmit signal may be determined by using parameters such as a start frequency and a signal bandwidth. Therefore, a frequency band occupied by the transmit signal of the radar is related to the parameters such as the start frequency and the signal bandwidth.

An existing operating frequency band of the vehicle-mounted radar is random, and utilization efficiency of the entire frequency resource segment used by the vehicle-mounted radar is low. With the wide use of the vehicle-mounted radar, mutual interference between vehicle-mounted radars becomes more serious. Due to mutual interference, a detection probability of the vehicle-mounted radar is reduced, or a false alarm probability of the vehicle-mounted radar is increased, posing a non-negligible impact on safety and comfort of driving.

SUMMARY

Embodiments of this application provide a signal transmission method and apparatus, to reduce or avoid interference between radars.

According to a first aspect, a signal transmission method applied to a first detection apparatus is provided. The method includes: The first detection apparatus determines a transmit frequency band, where the transmit frequency band includes N sub-frequency bands. The first detection apparatus transmits a signal on the transmit frequency band, where a bandwidth of the transmit frequency band is not less than an operating bandwidth of the first detection apparatus. A sum of bandwidths of any N−1 sub-frequency bands in the N sub-frequency bands is less than the operating bandwidth of the first detection apparatus. The N sub-frequency bands belong to a first frequency band. The first frequency band includes M sub-frequency bands, where N is less than or equal to M, and N and M are integers greater than or equal to 1.

The method may be executed by the first detection apparatus. For example, the first detection apparatus may be a radar detection apparatus. For example, the radar detection apparatus may be a radar. For example, the radar may be a millimeter-wave radar.

In this embodiment of this application, the first detection apparatus determines that the N sub-frequency bands in the first frequency band are transmit frequency bands, the operating bandwidth of the first detection apparatus is less than or equal to the bandwidth of the transmit frequency band, and the sum of the bandwidths of any N−1 sub-frequency bands in the N sub-frequency bands is less than the operating bandwidth of the first detection apparatus. In this way, the N sub-frequency bands of the M sub-frequency bands in the first frequency band are determined as the transmit frequency band of the first detection apparatus. This standardizes the transmit frequency band of the first detection apparatus, avoids randomization, improves resource utilization of the first frequency band, and further reduces interference between first detection apparatuses.

With reference to the first aspect, in a possible implementation of the first aspect, the first frequency band is a frequency band in which the first detection apparatus is operating. A plurality of first detection apparatuses may select a corresponding transmit frequency band in the first frequency band to transmit a signal.

With reference to the first aspect, in a possible implementation of the first aspect, the transmit frequency band includes the N sub-frequency bands. In other words, the transmit frequency band includes only an integer quantity of sub-frequency bands. In this way, the transmit signal of the first detection apparatus is transmitted on the integer quantity of sub-frequency bands, and does not occupy another redundant sub-frequency band. This can improve the resource utilization of the first frequency band.

With reference to the first aspect, in a possible implementation of the first aspect, a frequency domain range of the first frequency band is predefined or pre-specified. In this way, an operating frequency band of the first detection apparatus may be selected within a frequency range.

With reference to the first aspect, in a possible implementation of the first aspect, distribution of the M sub-frequency bands in the first band meets a predefined or pre-configured rule. The first frequency band is divided into the M sub-frequency bands in a predefined manner to divide the first frequency band by granularity. This can improve the resource utilization of the first frequency band.

With reference to the first aspect, in a possible implementation of the first aspect, the determining a transmit frequency band includes: A first detection frequency band in a plurality of detection frequency bands is determined as the transmit frequency band. A priority of the first detection frequency band is not lower than a priority of a detection frequency band other than the first detection frequency band in the plurality of detection frequency bands. The priority may be determined in a plurality of manners, for example, values of center frequencies of the plurality of detection frequency bands, idle degrees of the plurality of detection frequency bands, or energy values of the plurality of detection frequency bands. In this way, a first detection frequency band with a highest priority in the plurality of frequency bands is determined as the transmit frequency band. For example, the first detection frequency band is determined by using the values of the center frequencies of the plurality of detection frequency bands. This can reduce power consumption. For example, a first detection frequency band with a highest idle degree or a lowest energy value is determined as the transmit frequency band. This can improve the resource utilization, avoid overlapping between the transmit frequency band of the first detection apparatus and a transmit frequency band of another first detection apparatus, and reduce or avoid the interference between the first detection apparatuses.

With reference to the first aspect, in a possible implementation of the first aspect, the determining a transmit frequency band includes: A first detection frequency band in a plurality of detection frequency bands is determined as the transmit frequency band. An idle degree of the first detection frequency band is not lower than an idle degree of a detection frequency band other than the first detection frequency band in the plurality of detection frequency bands. A first detection frequency band with a highest idle degree is determined as the transmit frequency band. This can improve the resource utilization, reduce or avoid overlapping between the transmit frequency band of the first detection apparatus and a transmit frequency band of another first detection apparatus, and reduce or avoid the interference between the first detection apparatuses.

With reference to the first aspect, in a possible implementation of the first aspect, the determining a transmit frequency band includes: A first detection frequency band in a plurality of detection frequency bands is determined as the transmit frequency band. An energy value of the first detection frequency band is not higher than an energy value of a detection frequency band other than the first detection frequency band in the plurality of detection frequency bands. A first detection frequency band with a lowest energy value is determined as the transmit frequency band. In other words, a first detection frequency band with lowest utilization is determined as the transmit frequency band. This can reduce or avoid overlapping between the transmit frequency band of the first detection apparatus and a transmit frequency band of another first detection apparatus, and reduce or avoid the interference between the first detection apparatuses.

With reference to the first aspect, in a possible implementation of the first aspect, the energy value of the detection frequency band is determined by detecting a signal received on the detection frequency band. Energy values of the plurality of detection frequency bands are determined by detecting the signal on the detection frequency band.

With reference to the first aspect, in a possible implementation of the first aspect, the determining a transmit frequency band includes: Whether a first detection frequency band is idle is determined. If the first detection frequency band is idle, the first detection frequency band is determined as the transmit frequency band. If the first detection frequency band is not idle, whether a second detection frequency band is idle is determined. Whether the first detection frequency band is the transmit frequency band is determined by detecting whether the first detection frequency band is idle. This can improve resource utilization, reduce or avoid overlapping between the transmit frequency band of the first detection apparatus and a transmit frequency band of another first detection apparatus, reduce or avoid the interference between the first detection apparatuses, and reduce detection power consumption.

With reference to the first aspect, in a possible implementation of the first aspect, the determining whether a first detection frequency band is idle includes: An energy value of the first detection frequency band is determined. The energy value of the first detection frequency band is determined by detecting a signal received on the detection frequency band. If the energy value of the first detection frequency band is less than a preset value, that the first detection frequency band is idle is determined. If the energy value of the first detection frequency band is greater than a preset value, that the first detection frequency band is not idle is determined. The energy value of the first detection frequency band is determined by detecting the signal on the first frequency band. A detection frequency band whose energy value is less than the preset value is determined as the transmit frequency band. In other words, a detection frequency band whose utilization is less than the preset value is selected as the transmit frequency band. This can reduce or avoid the overlapping between the transmit frequency band of the first detection apparatus and the transmit frequency band of the another first detection apparatus, and reduce or avoid the interference between the first detection apparatuses.

According to a second aspect, a detection apparatus is provided, where the detection apparatus is configured to perform the method in any one of the first aspect or the possible implementations of the first aspect. Specifically, the detection apparatus may include modules configured to perform the method in any one of the first aspect or the possible implementations of the first aspect. For example, the detection apparatus includes a processing module and a transmission module. For example, the detection apparatus is a processing apparatus or a radar detection apparatus. The processing module is configured to determine a transmit frequency band, where the transmit frequency band includes N sub-frequency bands. The transmission module is configured to transmit a signal on the transmit frequency band, where a bandwidth of the transmit frequency band is not less than an operating bandwidth of the detection apparatus. A sum of bandwidths of any N−1 sub-frequency bands in the N sub-frequency bands is less than the operating bandwidth of the detection apparatus. The N sub-frequency bands belong to a first frequency band. The first frequency band includes M sub-frequency bands, where N is less than or equal to M, and N and M are integers greater than or equal to 1.

With reference to the second aspect, in a possible implementation of the second aspect, a frequency domain range of the first frequency band is predefined or pre-specified.

With reference to the second aspect, in a possible implementation of the second aspect, distribution of the M sub-frequency bands in the first frequency band meets a predefined or pre-configured rule.

With reference to the second aspect, in a possible implementation of the second aspect, that the processing module is configured to determine a transmit frequency band includes: The processing module is configured to determine a first detection frequency band in a plurality of detection frequency bands as the transmit frequency band. A priority of the first detection frequency band is not lower than a priority of a detection frequency band other than the first detection frequency band in the plurality of detection frequency bands.

With reference to the second aspect, in a possible implementation of the second aspect, that the processing module is configured to determine a transmit frequency band includes: The processing module is configured to determine a first detection frequency band in a plurality of detection frequency bands as the transmit frequency band. An idle degree of the first detection frequency band is not lower than an idle degree of a detection frequency band other than the first detection frequency band in the plurality of detection frequency bands.

With reference to the second aspect, in a possible implementation of the second aspect, that the processing module is configured to determine a transmit frequency band includes: The processing module is configured to determine a first detection frequency band in a plurality of detection frequency bands as the transmit frequency band. An energy value of the first detection frequency band is not greater than an energy value of a detection frequency band other than the first detection frequency band in the plurality of detection frequency bands.

With reference to the second aspect, in a possible implementation of the second aspect, the energy value of the detection frequency band is determined by detecting a signal received on the detection frequency band.

With reference to the second aspect, in a possible implementation of the second aspect, that the processing module is configured to determine a transmit frequency band includes: The processing module is configured to determine whether a first detection frequency band is idle. If the first detection frequency band is idle, the processing module is further configured to determine the first detection frequency band as the transmit frequency band. If the first detection frequency band is not idle, the processing module is further configured to determine whether a second detection frequency band is idle.

With reference to the second aspect, in a possible implementation of the second aspect, that the processing module is configured to determine whether a first detection frequency band is idle includes: The processing module is configured to determine an energy value of the first detection frequency band, where the energy value of the first detection frequency band is determined by detecting a signal received on the first detection frequency band. If the energy value of the first detection frequency band is less than a preset value, the processing module is configured to determine that the first detection frequency band is idle. If the energy value of the first detection frequency band is greater than a preset value, the processing module is configured to determine that the first detection frequency band is not idle.

For technical effects brought by the second aspect or the possible implementations of the second aspect, refer to the descriptions of the technical effects of the first aspect or the implementations of the first aspect. Details are not described again.

According to a third aspect, a detection apparatus is provided, including a processor and a memory. The memory is configured to store one or more programs, and the one or more programs include a computer-executable instruction. When the apparatus runs, the processor executes the one or more programs stored in the memory, to enable the apparatus to perform the method according to the first aspect or the possible implementations of the first aspect.

According to a fourth aspect, an embodiment of this application further provides a computer-readable storage medium. The computer storage medium stores a computer program. When the computer program runs on a computer, the computer is enabled to perform the method according to the first aspect or the possible implementations of the first aspect.

According to a fifth aspect, an embodiment of this application further provides a computer program product. The computer program product includes a computer program. When the computer program runs on a computer, the computer is enabled to perform the method according to the first aspect or the possible implementations of the first aspect.

According to a sixth aspect, an embodiment of this application provides a chip. The chip includes a processor and a communications interface. The processor is configured to invoke instructions from the communications interface and run the instructions. When the processor executes the instructions, the chip is enabled to perform the method according to the first aspect or the possible implementations of the first aspect.

According to a seventh aspect, an embodiment of this application provides a system. The system includes at least one detection apparatus according to the second aspect or the third aspect or the chip according to the sixth aspect.

BRIEF DESCRIPTION OF DRAWINGS

To describe the technical solutions in the embodiments of the present disclosure more clearly, the following briefly introduces the accompanying drawings for describing the embodiments of the present disclosure. It is clear that the accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1A:
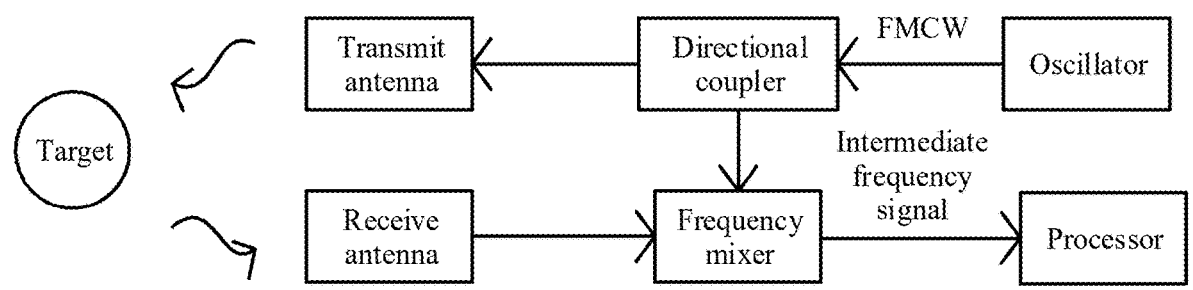
FIG. 1A provides a schematic diagram of a structure of a radar apparatus.

To make objectives, technical solutions and advantages of the embodiments of this application clearer, the following further describes the embodiments of this application in detail with reference to the accompanying drawings.

1. Concepts

The following describes some terms of the embodiments of this application to facilitate understanding of a person skilled in the art.

(1) A detection apparatus may be, for example, a radar, or may be another apparatus configured to perform detection (for example, ranging).

(2) A radar also referred to as a radar apparatus, may alternatively be referred to as a detector, a radar detection apparatus, a radar signal transmission apparatus, or the like. An operating principle of the radar is to transmit a signal (or referred to as a detection signal) and receive a reflected signal reflected by a target object, to detect a corresponding target object. The signal transmitted by the radar may be a radar signal, and correspondingly the received reflected signal reflected by the target object may also be the radar signal.

(3) A transmit period of a radar detection apparatus (or referred to as a frequency scanning period, a frequency scanning time, or frequency scanning duration of the radar detection apparatus) refers to a period in which the radar detection apparatus transmits a radar signal with a complete waveform. Generally, the radar detection apparatus sends radar signals in a plurality of frequency scanning periods within continuous duration.

(4) Initial frequency of a radar detection apparatus: At the beginning of a transmit period, the radar detection apparatus transmits a radar signal at a frequency known as an initial frequency of the radar detection apparatus. In addition, a transmit frequency of some radar detection apparatuses changes in the transmit period based on the initial frequency. However, some radar detection apparatuses transmit at a constant frequency, and a transmit frequency of the radar detection apparatuses does not change in the transmit period.

(5) A frequency scanning bandwidth is a bandwidth occupied by a waveform of a radar signal transmitted by a radar detection apparatus. It should be noted that the "frequency scanning bandwidth" is defined for ease of description, which may also be referred to as an operating bandwidth, and is technically the bandwidth occupied by the waveform of the radar signal transmitted by the radar detection apparatus. Further, a frequency band occupied by the waveform of the radar signal transmitted by the radar detection apparatus may be referred to as a frequency scanning band.

(6) A frequency-modulated continuous wave (FMCW) is an electromagnetic wave whose frequency changes with time.

(7) A linear frequency-modulated continuous wave is an electromagnetic wave whose frequency changes linearly with time. The linear change herein generally refers to a linear change within a transmit period. Specifically, a waveform of the linear frequency-modulated continuous wave is generally a sawtooth wave or a triangular wave, or may be another possible waveform, for example, a linear frequency-modulated frequency step waveform.

(8) A maximum ranging distance of a radar detection apparatus, or referred to as a maximum detection distance of the radar detection apparatus, is a parameter related to configuration of the radar detection apparatus (for example, related to a factory setting parameter of the radar detection apparatus). For example, the radar detection apparatus is a radar, the maximum ranging distance of a long-range ACC radar is 250 m, and a maximum ranging distance of a medium-range radar is 70-150 m.

(9) An intermediate frequency (IF) signal: That a radar detection apparatus is a radar is used as an example. A local-frequency signal of the radar and a reflected signal (a signal obtained after a transmit signal of the radar is reflected by a target object) received by the radar are processed by a frequency mixer, and then are processed by a low-pass filter, to obtain the intermediate frequency signal. Specifically, a part of a frequency-modulated continuous wave signal generated by an oscillator is used as a local-frequency signal, and another part of the frequency-modulated continuous wave signal is used as a transmit signal and is transmitted through a transmit antenna. A reflected signal of the transmit signal received by a receive antenna is mixed with the local-frequency signal, and the "intermediate frequency signal" is obtained. One or more pieces of location information, speed information, or angle information of the target object may be obtained by using the intermediate frequency signal. The location information may be location information of the target object relative to a current radar. The speed information may be speed information of the target object relative to the current radar. The angle information may be angle information of the target object relative to the current radar. Further, a frequency of the intermediate frequency signal is referred to as an intermediate frequency.

(10) "At least one" means one or more, and "a plurality of" means two or more. The term "and/or" describes an association relationship between associated objects, and indicates that three relationships may exist. For example, A and/or B may represent the following cases: Only A exists; both A and B exist; and only B exists, where A and B may be singular or plural. The character "/" generally indicates an "or" relationship between the associated objects. "At least one of the following items (pieces)" or a similar expression means any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural.

In addition, unless otherwise stated, ordinal numbers such as "first" and "second" in the embodiments of this application are used to distinguish between a plurality of objects, and but are not intended to limit a sequence, a time sequence, priorities, or importance of the plurality of objects. For example, first information and second information are merely intended to distinguish between different messages, but do not indicate that the two types of information are different in content, a priority, a sending sequence, importance, or the like.

2. System Architecture

In recent years, ADAS has played an important role in intelligent vehicles. The ADAS uses various sensors installed on the vehicle to sense a surrounding environment, collect data, and identify, detect, and track static and moving objects during a driving process. The ADAS performs calculation and analysis based on navigation map data. In this way, a driver can foresee possible danger in advance. This effectively improves comfort and safety of driving. In short, real unmanned driving is a product of the ultimate development of the ADAS. In an unmanned driving architecture, a sensing layer is paralleled to the "eye" of a vehicle, and includes a vision sensor such as a vehicle-mounted camera, and a radar sensor such as a vehicle-mounted millimeter-wave radar, a vehicle-mounted laser radar, and a vehicle-mounted ultrasonic radar. A millimeter-wave radar is the first to become a main sensor in an unmanned driving system due to cost-effectiveness and mature technologies. Currently, the ADAS has developed more than 10 functions, including adaptive cruise, automatic emergency braking, lane change assistance, or blind spot monitoring and the like, which are inseparable from the vehicle-mounted millimeter wave radar.

A millimeter wave is an electromagnetic wave with a wavelength ranging from 1 mm to 10 mm, and a corresponding frequency range is 30 GHz to 300 GHz. In this frequency band, millimeter wave-related features make the millimeter wave ideally suitable for the vehicle-mounted field. The millimeter wave-related features are as follows: Large bandwidth: An abundant frequency domain resource, and a low antenna side lobe are conducive to implementation of imaging or quasi-imaging. Short wavelength: A volume of a radar device and a diameter of antenna are reduced because of the short wavelength, and hence the weight is reduced. Narrow beam: In the same antenna size, a millimeter wave beam is much narrower than a microwave beam, and radar resolution is high. Strong penetration: Compared with laser radar and an optical system, a millimeter wave is more capable of penetrating smoke, dust and fog, and can work around the clock.

A vehicle-mounted millimeter-wave radar system generally includes apparatuses such as an oscillator, a transmit antenna, a receive antenna, a frequency mixer, a processor, and a controller. FIG. 1A is an operating principle diagram of the millimeter-wave radar. The oscillator generates a radar signal whose frequency increases linearly with time, and the radar signal is generally a frequency-modulated continuous wave. A part of the radar signal is output to the frequency mixer as a local-frequency signal through a directional coupler, and another part is transmitted through the transmit antenna. The receive antenna receives the radar signal that is reflected back after the transmitted radar signal encounters an object in front of the vehicle. The frequency mixer performs frequency mixing on the received radar signal and a local-frequency signal, to obtain an intermediate frequency signal. The intermediate frequency signal contains a relative distance, velocity and an angle between a target object and a radar system. The intermediate frequency signal that passes through the low-pass filter and that has undergone amplification processing is transmitted to the processor. The processor usually performs fast Fourier transform, spectrum analysis, and the like on the received signal, to obtain the distance, the velocity and the angle between the target object and the radar system. Finally, the processor may output the obtained information to the controller (not shown in the figure). The controller may be located outside the radar, to control a behavior of the vehicle. It should be noted herein that, with the development of technologies, the controller may alternatively be located outside the radar.

Figure 1B:
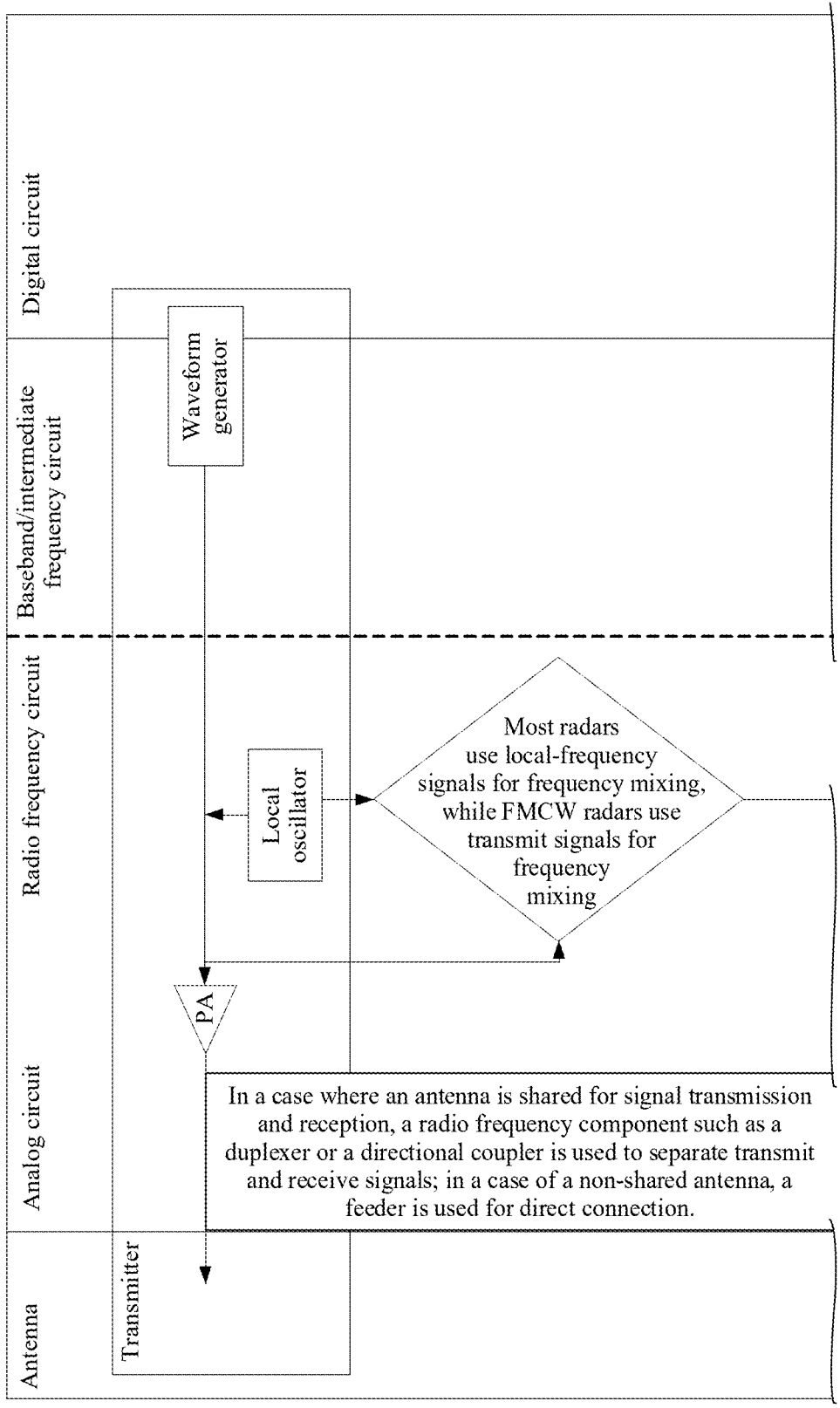
FIG. 1B and FIG. 1C provide another schematic diagram of a structure of a radar apparatus.
Figure 1C:
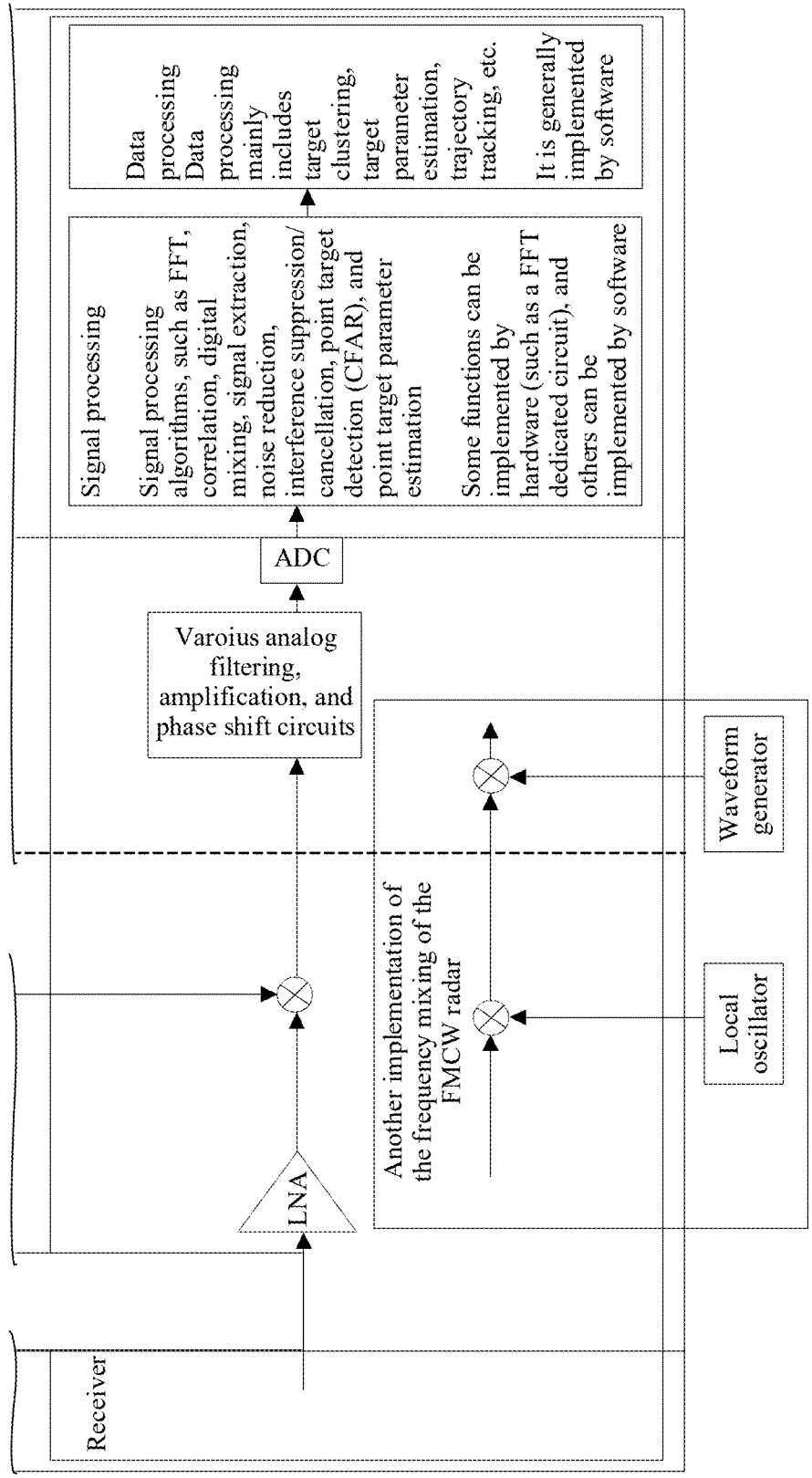

FIG. 1A is merely an example of the operating principle diagram of the millimeter-wave radar. Alternatively, the operating principle diagram of the millimeter-wave radar may be shown in FIG. 1B and FIG. 1C. This application merely provides examples of two possible radar operating principles. In actual application, the radar operating principle may alternatively be in another form, and is not limited to the examples of the foregoing operating principles.

A waveform of a frequency-modulated continuous wave of the millimeter-wave radar is generally a sawtooth wave or a triangular wave. The following uses the sawtooth wave as an example to describe in detail a ranging principle of the millimeter-wave radar. A ranging principle of the triangular wave is similar to a ranging principle of the sawtooth wave.

Figure 2:
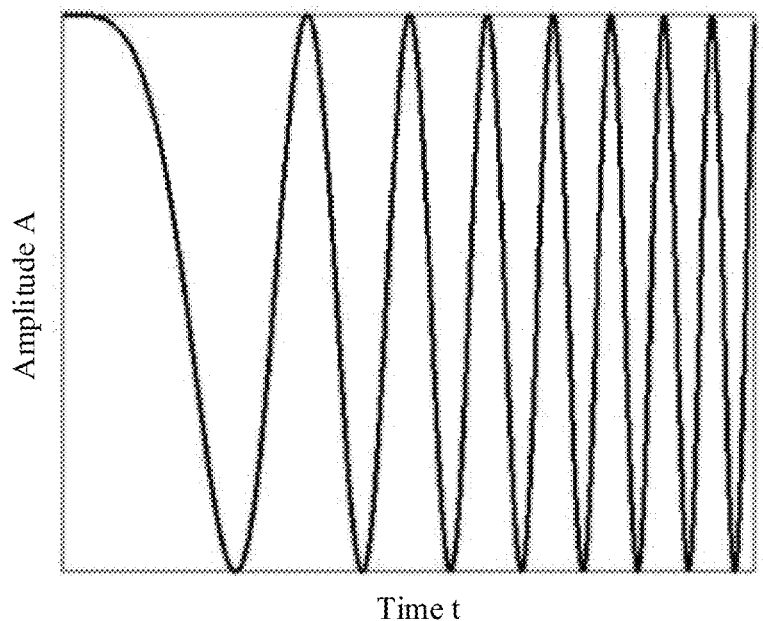
FIG. 2 is a schematic diagram of a frequency-modulated continuous wave.
Figure 3:
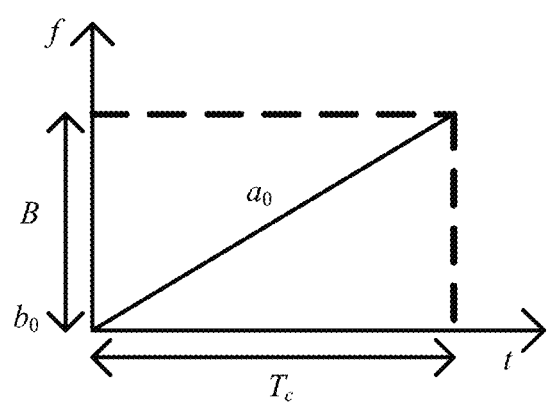
FIG. 3 is a schematic diagram of a linear change in a frequency of a frequency-modulated continuous wave with time.

As shown in FIG. 2, the linear frequency-modulated continuous wave is a signal whose frequency changes linearly with time. As shown in FIG. 3, a period of the frequency-modulated continuous wave is $T_c$, a slope is $a_0$, a bandwidth is B, and a start frequency is $b_0$. The frequency-modulated continuous wave signal shown in FIG. 2 is also referred to as a chirp signal.

An equivalent baseband signal of a single-period frequency-modulated continuous wave output by the oscillator of the millimeter-wave radar may be expressed as:

$$S_{BB}^T(t) = A\exp\left\{j2\pi\left[\frac{a_0}{2}t^2 + b_0 t + \varphi_0\right]\right\}, \quad \text{(formula 1.1)}$$
$$0 \le t \le T_c$$

A represents an amplitude of the equivalent baseband signal, $a_0$ represents a slope of the equivalent baseband signal, $b_0$ represents a Y-axis intercept of the equivalent baseband signal, $\varphi_0$ represents an initial phase of the equivalent baseband signal, and exp represents an exponential function of e. A frequency is defined as a change rate of a phase relative to time. Therefore, a frequency of the equivalent baseband signal is:

$$f = \frac{d\left(\frac{a_0}{2}t^2 + b_0 t + \varphi_0\right)}{dt} = a_0 t + b_0, \quad \text{(formula 1.2)}$$
$$0 \le t \le T_c$$

An image of formula 1.2 is shown in FIG. 3.

After up-conversion, the equivalent baseband signal sent by the oscillator is radiated outward by the transmit antenna of the millimeter-wave radar. A transmit signal can be expressed as follows:

$$S_{RF}^T(t) = A\exp\left\{j2\pi\left[\frac{a_0}{2}t^2 + b_0 t + \varphi_0\right]\right\}\exp(j2\pi f_c t) = \quad \text{(formula 1.3)}$$
$$A\exp\left\{j2\pi\left[\frac{a_0}{2}t^2 + (b_0 + f_c)t + \varphi_0\right]\right\},$$
$$0 \le t \le T_c$$

Figure 4:
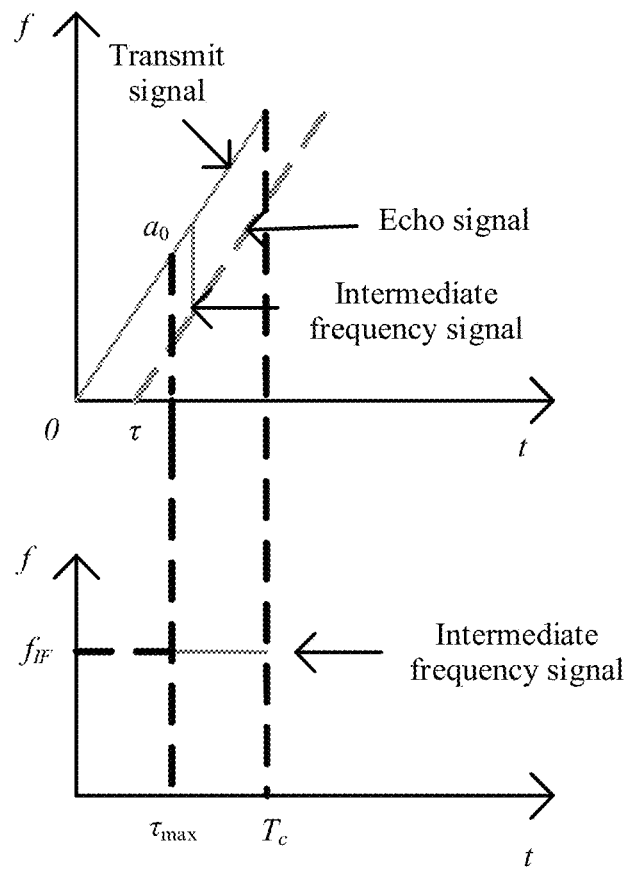
FIG. 4 is a schematic diagram of possible frequency changes of a transmit signal, a reflected signal, and an intermediate frequency signal.

After the signal encounters an obstacle, the signal is reflected back and then received by the millimeter-wave radar. A shape of the waveform of the transmit signal is the same as a shape of a waveform of a reflected signal. However, there is a latency $\tau$ between the waveform of the reflected signal and the waveform of the transmit signal. Refer to FIG. 4. In FIG. 4, an echo signal is the reflected signal. The received reflected signal may be expressed as:

$$S_{RF}^R(t-\tau) = \quad \text{(formula 1.4)}$$
$$A'\exp\left\{j2\pi\left[\frac{a_0}{2}(t-\tau)^2 + (b_0 + f_c)(t-\tau) + \varphi_0\right]\right\},$$
$$0 \le t \le T_c$$

A signal obtained after down-conversion is performed on the received equivalent baseband signal is:

$$S_{BB}^R(t-\tau) = \quad \text{(formula 1.5)}$$
$$A'\exp\left\{j2\pi\left[\frac{a_0}{2}(t-\tau)^2 + b_0(t-\tau) - f_c\tau + \varphi_0\right]\right\},$$
$$0 \le t \le T_c$$

A' is an amplitude of a signal obtained after the equivalent baseband signal transmitted by the oscillator undergoes a transmit antenna gain, being reflected from an object, a propagation loss, and a receive antenna gain. $\tau$ is the latency between the radar signal transmitted by a transmitter of the millimeter-wave radar and the echo signal (namely, the reflected signal) received by a receiver of the millimeter-wave radar. As shown in FIG. 4, the latency is twice the distance/speed of light. In addition, in FIG. 4, $\tau_{max}$ represents echo latency corresponding to a maximum detection distance of the millimeter-wave radar. In other words, when a distance between the millimeter-wave radar and the target object is a maximum distance that can be detected by the millimeter-wave radar, $\tau_{max}$ is the latency of the reflected signal received by the millimeter-wave radar relative to the transmit signal. A relationship between $\tau$ and a target distance d may be expressed as:

$$\tau = \frac{2d}{c} \quad \text{(formula 1.6)}$$

c is the speed of light.

The frequency mixer of the millimeter-wave radar mixes the received signal with the local-frequency signal, and outputs the intermediate frequency signal after the received signal passes through the low-pass filter. The intermediate frequency signal is expressed as:

$$S_{IF}(t) = S_{BB}^T \times [S_{BB}^R(t-\tau)]^* = AA'\exp(j2\pi f_c \tau) \quad \text{(formula 1.7)}$$
$$\exp\left[-j2\pi\left(\frac{a_0}{2}\tau^2 - b_0\tau\right)\right]\exp[j2\pi(a_0\tau i)],$$
$$\tau \le t \le T_c$$

The intermediate frequency signal is transmitted to the processor of the millimeter-wave radar for processing such as fast Fourier transform, and a frequency $f_{IF}$ of the intermediate frequency signal may be obtained.

In addition, as shown in FIG. 4, the frequency of the intermediate frequency signal is a product of a slope of the waveform of the transmit signal and the latency $\tau$, that is:

$$f_{IF} = a_0 \cdot \tau = \frac{B}{T_C} \cdot \frac{2d}{c} = \frac{2d}{c \cdot T_C}B \quad \text{(formula 1.8)}$$

Therefore, the distance d between the millimeter-wave radar and the target object is:

$$d = \frac{c \cdot T_C}{2B} f_{IF} \quad \text{(formula 1.9)}$$

It can be learned from the foregoing deduction process that, a frequency difference (namely, the frequency of the intermediate frequency signal) between the transmit signal and the receive signal is in a linear relationship with the latency. A longer distance of the target object indicates a later time of receiving the reflected signal, and a larger frequency difference between the reflected signal and the transmit signal. Therefore, the distance between the radar and the target object may be determined by determining the frequency of the intermediate frequency signal. In addition, the foregoing process of processing the radar signal is merely an example, and a specific radar processing process is not limited.

As more vehicle-mounted radars are used, mutual interference between vehicle-mounted radars becomes more and more severe. This greatly reduces a radar detection probability or increases a false alarm probability of the radar detection, posing a non-negligible impact on the safety or the comfort of driving.

Figure 5:
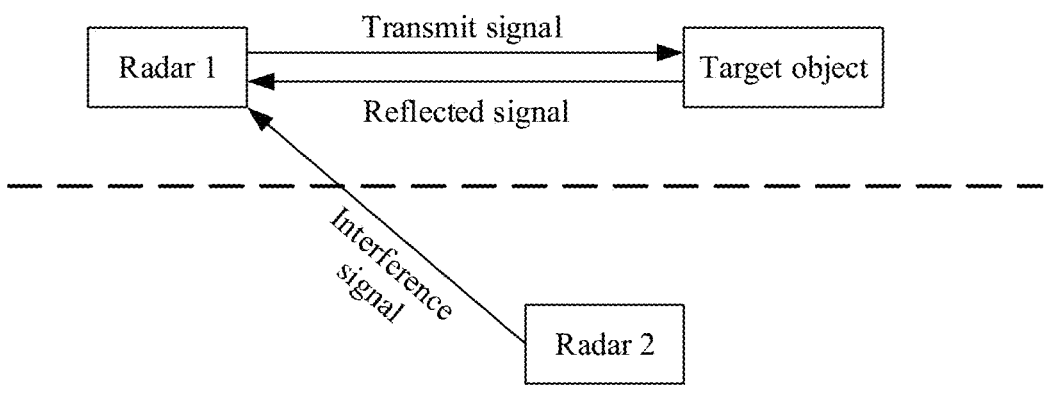
FIG. 5 is a schematic diagram of mutual interference between vehicle-mounted radars.

FIG. 5 is a schematic diagram of the mutual interference between the vehicle-mounted radars. A radar 1 transmits a transmit signal, and receives a reflected signal that is reflected back by the transmit signal on the target object. When the radar 1 receives the reflected signal, a receive antenna of the radar 1 also receives a transmit signal or a reflected signal of a radar 2. In this case, the transmit signal of the radar 2 or the reflected signal of the radar 2 that is received by the radar 1 is an interference signal for the radar 1.

For example, assume that the radar 1 is an observation radar, and a frequency-modulated continuous wave slope is $a_0$, an intercept is $b_0$, and a period is $T_c$. The radar 2 is an interference radar, and a frequency-modulated continuous wave slope is $a_1$, and an intercept is $b_1$. In this case, assume that $b_0=b_1$. An echo latency corresponding to a maximum ranging distance of the radar 1 is $\tau_{max}$ (To be specific, a latency calculated by substituting the maximum detection distance of the radar into formula 1.6. For example, if the maximum detection distance of the radar is 250 m, the latency calculated by using formula 1.6 is 1.67 µs). A latency of the interference signal of the radar 2 that arrives at a receiver of the radar 1 is $\tau_1$. Considering that there is a timing error $\Delta\tau$ at a radar transmission moment (for example, an error of a transmission moment caused by a timing error of the Global Positioning System (GPS), such as 60 ns). A time interval for the radar to detect the received signal is $\tau_{max} \sim T_c$.

Figure 6:
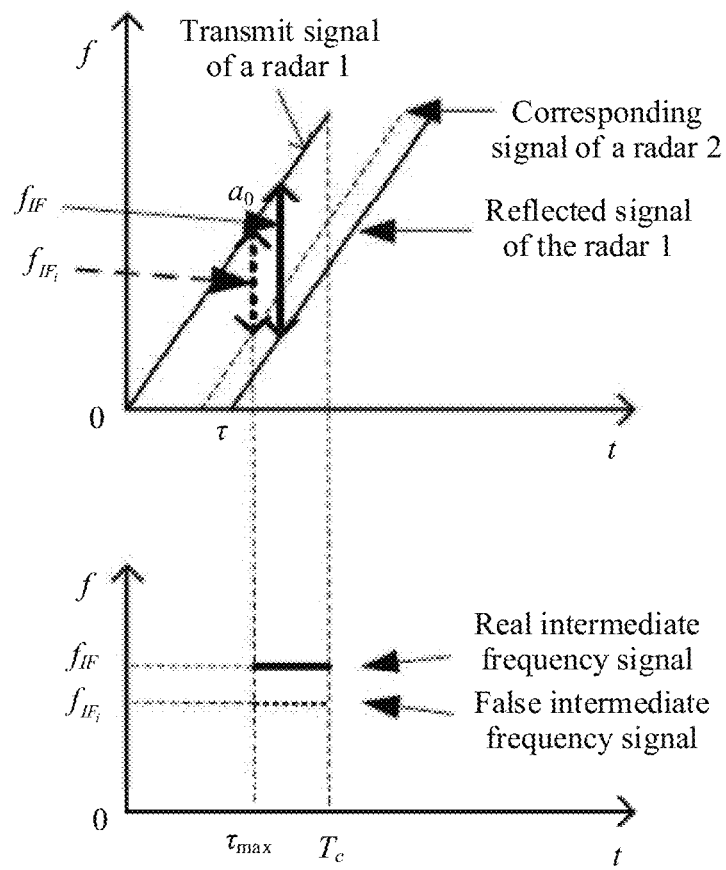
FIG. 6 and FIG. 7 are schematic diagrams of a possible false intermediate frequency signal.
Figure 7:
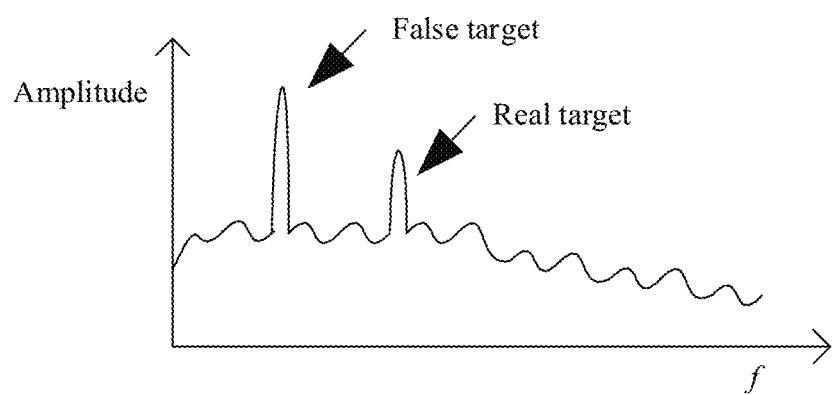

FIG. 6 and FIG. 7 are schematic diagrams of a possible false intermediate frequency signal. If a slope of the radar signal transmitted by the radar 1 is the same as a slope of the radar signal transmitted by the radar 2, that is, $a_0=a_1$, and operating frequency bands of the radar 1 and the radar 2 overlap, a false alarm occurs. As shown in FIG. 6, the radar 1 transmits the signal to the target object, and receives the reflected signal from the target object. However, within a time range between transmitting the signal and receiving the reflected signal by the radar 1, the receive antenna of the radar 1 receives the transmit signal or the reflected signal (shown in the dashed line) of the radar 2. A signal waveform of the radar 1 is the same as a signal waveform of the radar 2, and a frequency scanning bandwidth of the radar 1 is the same as a frequency scanning bandwidth of the radar 2. Within a target echo observation range of the radar 1, the radar 1 receives a signal represented by the dashed line of a corresponding frequency. In this case, the radar 1 considers that a target object 1 exists. If the radar 1 detects a signal represented by a dashed line and a reflected signal represented by a solid line in a signal processing time range ($\tau_{max} \sim T_c$), the radar 1 mistakenly considers the received signal represented by the dashed line as a reflected signal of an object that exists in front of the radar 1. In this case, a false intermediate frequency signal is generated. After fast Fourier transform is performed, spectrum analysis is performed on the radar 1, and two peak values may be found. As shown in FIG. 7, each peak value corresponds to one target object, and the radar 1 considers that both the "target object 1" and a "target object 2" exist. The radar 1 mistakenly considers that "target object 1" exists in the front, but actually, the "target object 1" does not exist. This is referred to as a "ghost" or a "false alarm". After the false alarm occurs, the vehicle in autonomous driving slows down or suddenly brakes when there is no object in the front. This reduces the comfort of driving.

Figure 8:
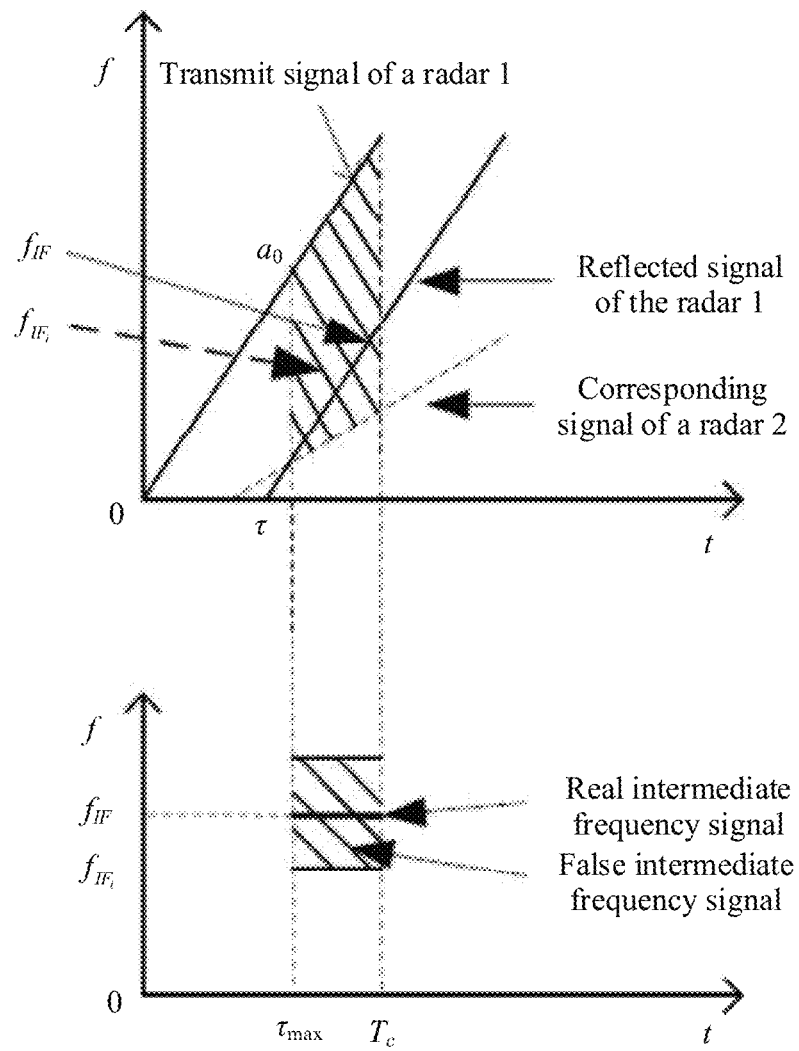
FIG. 8 and FIG. 9 are schematic diagrams in which a possible interference signal overwhelms a target signal.
Figure 9:
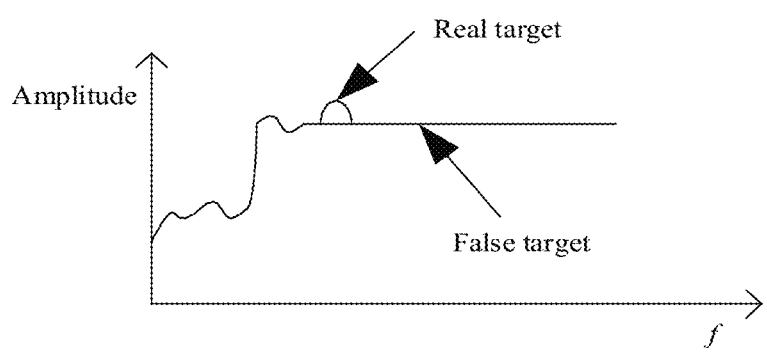

FIG. 8 and FIG. 9 are schematic diagrams in which a possible interference signal overwhelms the target signal. As shown in FIG. 8, the radar 1 transmits the signal to the target object, and receives the reflected signal from the target object. However, within the target echo observation range of the radar 1, the receive antenna of the radar 1 receives the transmit signal or the reflected signal (shown in the dashed line) of the radar 2. There is a slope difference between the signal waveform of the radar 1 and the signal waveform of the radar 2. In a signal detection time range ($\tau_{max} \sim T_c$), the radar 1 detects the reflected signal of the radar 1 and a corresponding signal of the radar 2. After the detected corresponding signal of the radar 2 is mixed with the reflected signal of the radar 1, an intermediate frequency signal including various frequency components is generated. After the fast Fourier transform is performed, as shown in FIG. 9, an interference platform that weakens a "sharpness" degree of the real target object. This brings difficulties to detection and increases possibility of missing detection. If missing detection occurs, the vehicle in autonomous driving may mistakenly consider that there is no object in the front, and does not slow down or brake the vehicle, which causes a traffic accident. This reduces the safety of driving.

Figure 10:
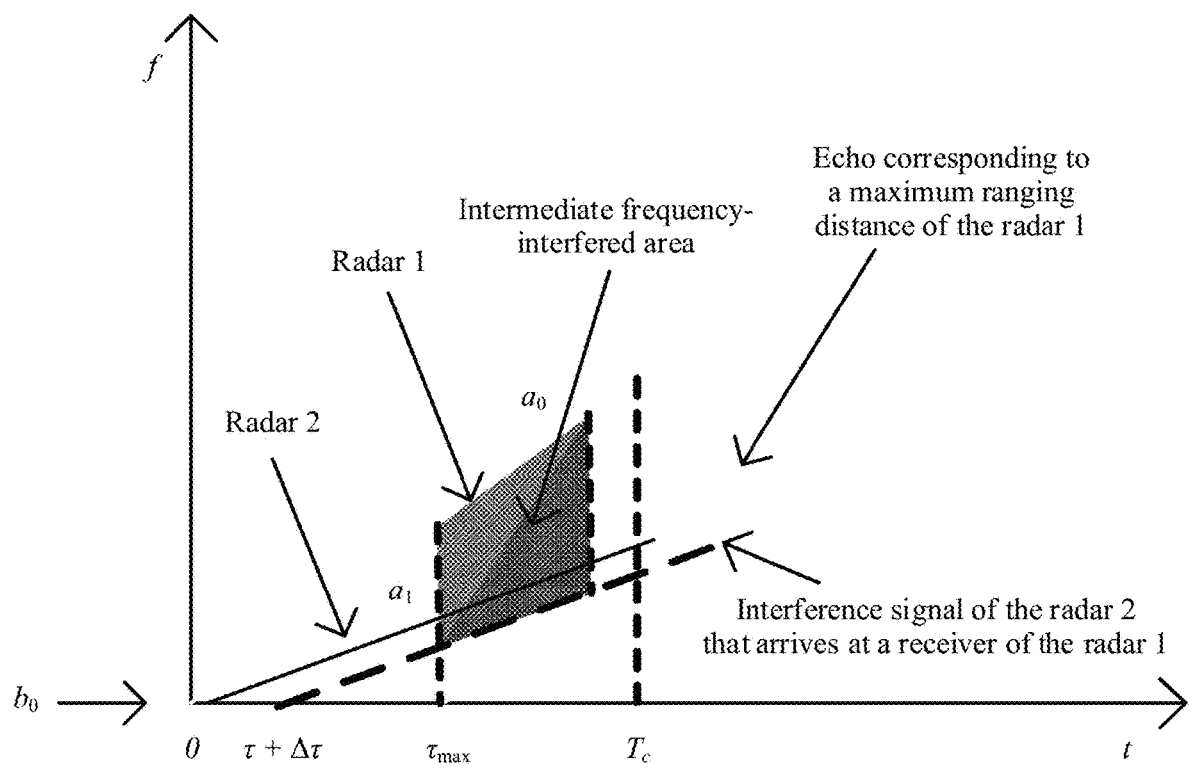
FIG. 10 is a schematic diagram of an interference platform.

Specifically, there is the slope difference between the signal waveform of the radar 1 and the signal waveform of the radar 2. If a waveform slope of the radar 1 is $a_0$, and a waveform slope of the radar 2 is $a_1$, the difference between the two slopes may be classified into the following two cases:

When $a_1 < a_0$, as shown in FIG. 10, the interference platform occurs, and missing detection occurs.

Figure 11:
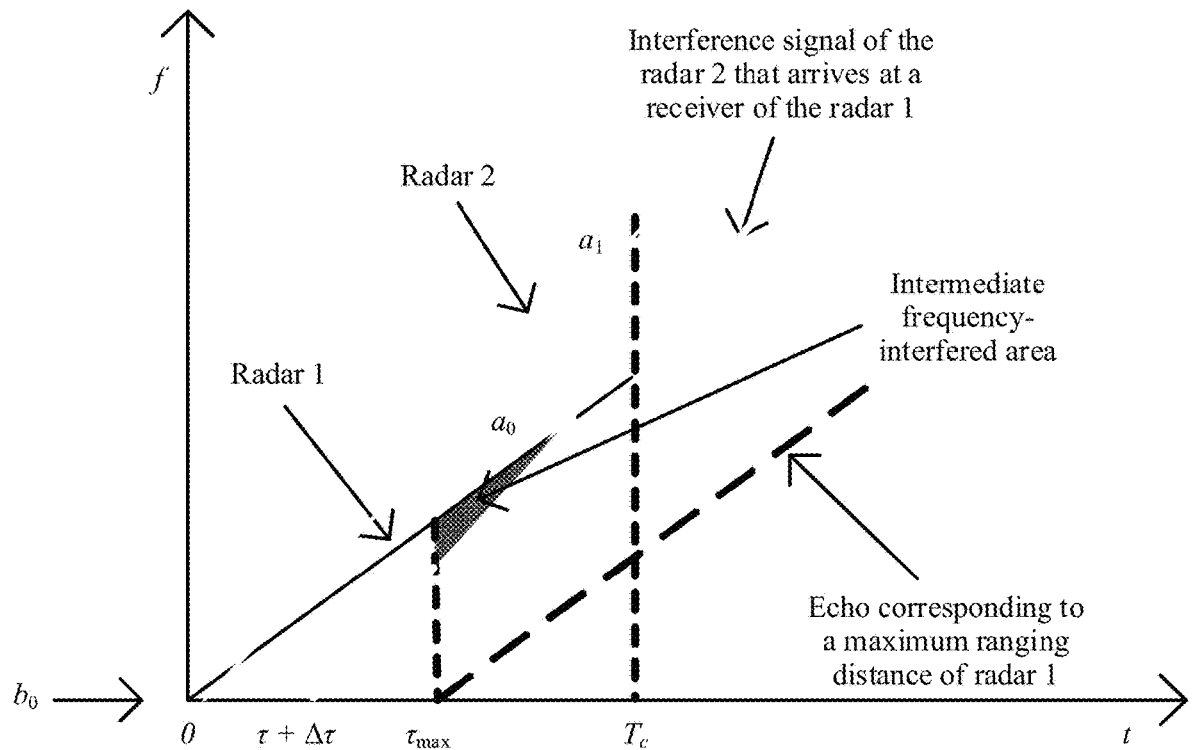
FIG. 11 is a schematic diagram of an interference platform.

When $a_1 > a_0$, as shown in FIG. 11, the interference platform also occurs, and missing detection occurs.

It should be noted that, a person skilled in the art may understand that a signal received at a moment or in a period of time may be an interference signal, or may be a reflected signal of a target object. A radar detection status can be clearly indicated by changes in time and a frequency of a transmitted/reflected signal. Therefore, in subsequent descriptions of the embodiments of this application, a curve chart indicating a slope (a frequency range within a specific period of time) of the transmitted/reflected signal is mostly used to indicate the mutual interference between the radars.

However, if the radar detection probability is reduced or the false alarm probability of the radar detection is increased, the impact on the safety or the comfort of driving is non-negligible. Therefore, how to reduce the interference between the vehicle-mounted radars is a problem that needs to be resolved.

Figure 12:
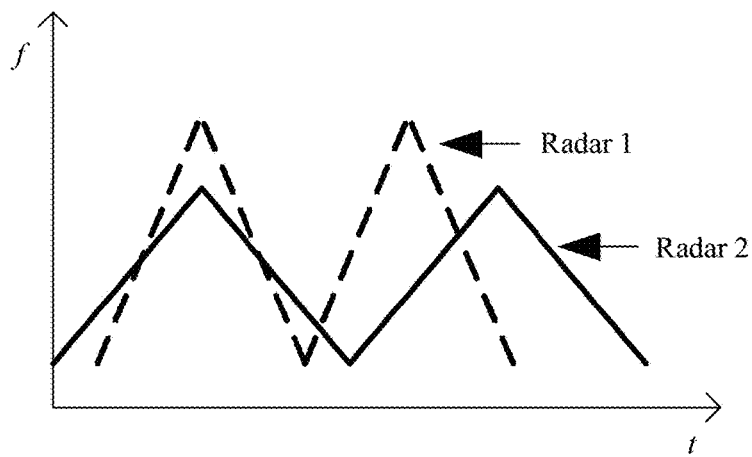
FIG. 12 is a schematic diagram of a possible solution.
Figure 13:
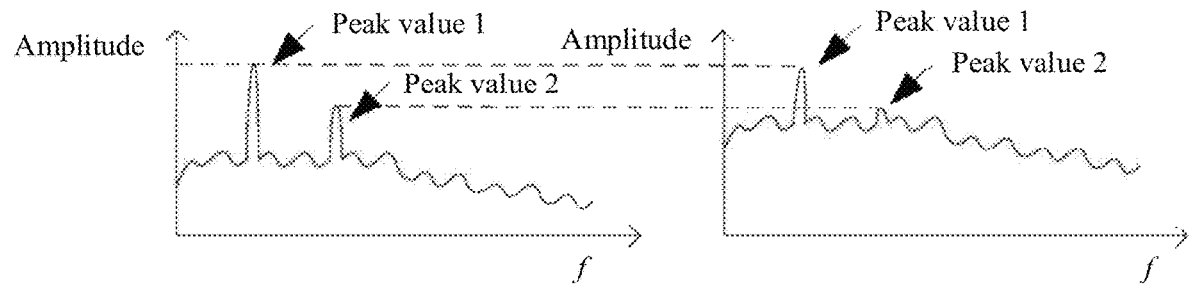
FIG. 13 is a schematic diagram of a possible false alarm result.

To resolve the foregoing problem, in a possible solution, different parameters such as a waveform slope and a period may be set for different radars. FIG. 12 is a schematic diagram of a possible solution. As shown in FIG. 12, parameters such as a slope and a transmit period of a signal of the radar 1 are inconsistent with those of the radar 2. In this way, even if the radar 1 receives a signal of the radar 2, because the waveforms of the signals of the radar 1 and the radar 2 are inconsistent, when the signals pass through the frequency mixer, namely, when there is a difference between the frequencies, an intermediate frequency signal with a constant frequency is not generated. Only the intermediate frequency signal with the constant frequency is represented as a peak signal in the spectrum analysis. Therefore, this method can reduce a ghost probability. However, if the radar 1 receives the signal from the radar 2, after the received signal passes through the frequency mixer, the interference signal falls within a valid receive intermediate frequency bandwidth, and hence strength of the interference signal increases. After an interference signal level is increased, the original target signal is overwhelmed due to interference, as shown in FIG. 13. FIG. 13 is a schematic diagram of a possible missing detection result. A consequence is that the obstacle in front of the vehicle is not detected, and therefore missing detection occurs. This poses a severe impact on the safety of driving, especially on safety of an unmanned vehicle.

Figure 14:
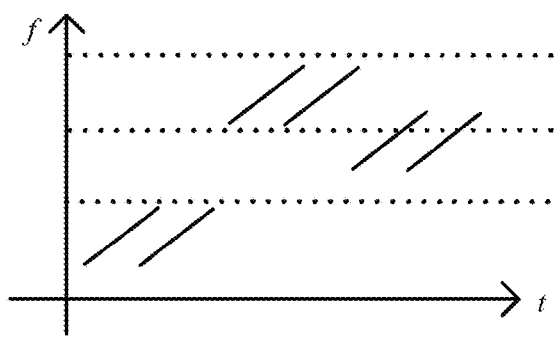
FIG. 14 is a schematic diagram of another possible solution.
Figure 15:
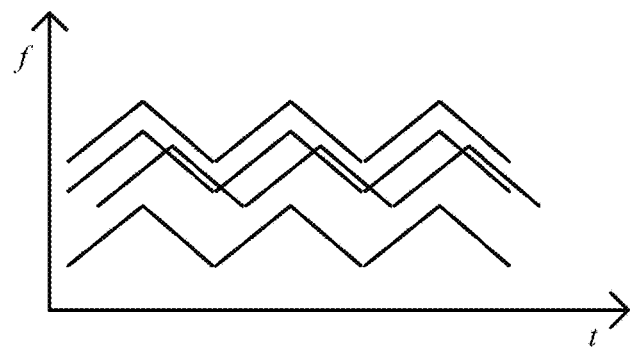
FIG. 15 is a schematic diagram of still another possible solution.

FIG. 14 is a schematic diagram of another possible solution. The technology used in this solution is the radar waveform frequency shift technology. If a radar detects interference from another radar in its frequency scanning band, the radar shifts to another frequency band to prevent interference between a plurality of radars. In the frequency shift technology, a frequency shift interval may be greater than a frequency scanning bandwidth of the radar, as shown in FIG. 14. In this case, waveforms of the radars are completely frequency-divided and do not overlap. However, as a result of setting of the frequency shift interval, too many frequency-domain resources are occupied, while frequency-domain resources allocated to the vehicle-mounted radars are limited at present. Alternatively, the frequency shift technology is still used, but after detecting interference from another radar in its operating frequency band, the radar performs a random frequency shift, as shown in FIG. 15. FIG. 15 is a schematic diagram of still another possible solution. In this case, the interference can be reduced to some extent. However, a complete random frequency shift may inevitably cause the waveforms of the two radars to be too close in frequency domain after the frequency shift. As a result, the ghost occurs or the strength of the interference signal increases, causing missing detection of objects.

In view of this, technical solutions in the embodiments of this application are provided. In this embodiment of this application, a first detection apparatus determines that N sub-frequency bands in a first frequency band are transmit frequency bands, an operating bandwidth of the first detection apparatus is less than or equal to a bandwidth of the transmit frequency band, and a sum of bandwidths of any N−1 sub-frequency bands in the N sub-frequency bands is less than the operating bandwidth of the first detection apparatus. In this way, the N sub-frequency bands of M sub-frequency bands in the first frequency band are determined as the transmit frequency band of the first detection apparatus. This standardizes the transmit frequency band of the first detection apparatus, avoids randomization, improves resource utilization of the first frequency band by dividing the first frequency by granularity, and further reduces or avoids interference between first detection apparatuses.

Figure 16:
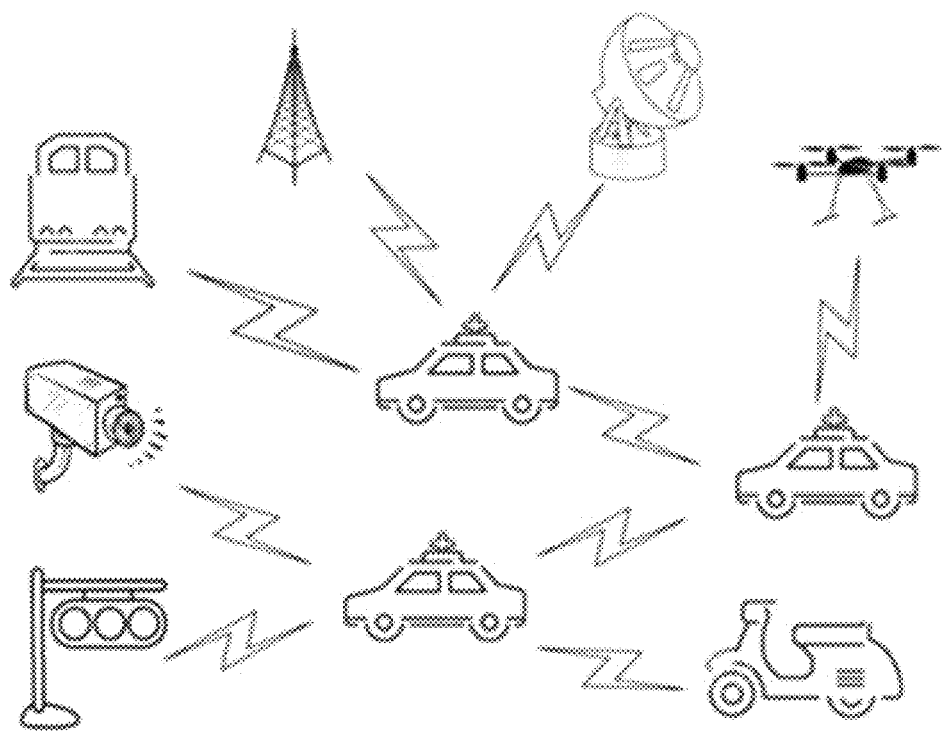
FIG. 16 is a schematic diagram of a possible application scenario according to an embodiment of this application.

FIG. 16 is a schematic diagram of a possible application scenario according to an embodiment of this application. The foregoing application scenario may be applied to unmanned driving, autonomous driving, intelligent driving, connected driving, or the like. A radar detection apparatus may be installed on a motor vehicle (for example, an unmanned vehicle, an intelligent vehicle, an electric vehicle, or a digital-based vehicle), an unmanned aerial vehicle, a railcar, a bicycle, a signal light, a speed measurement apparatus or a network device (for example, a base station or a terminal device in various systems), or the like. The embodiments of this application are applicable not only to a radar detection apparatus between vehicles, but also to a radar detection apparatus of another apparatus such as a vehicle and an unmanned aerial vehicle, or a radar detection apparatus between other apparatuses. In addition, the radar detection apparatus may be installed on a mobile device, for example, the radar detection apparatus is installed on a vehicle as a vehicle-mounted radar detection apparatus, or the radar detection apparatus may be installed on a fixed device, for example, installed on devices such as a road side unit (RSU). An installation position, a function, and the like of the radar detection apparatus are not limited in the embodiments of this application.

In addition, the signal transmitted by the radar detection apparatus may be a radio signal, and the radio signal may be considered as a radar signal. In this embodiment of this application, an example in which the first detection apparatus is the radar detection apparatus and the signal transmitted by the radar detection apparatus is a radar signal is used.

3. Description of a First Frequency Band

It should be noted that, in the embodiments of this application, a first frequency band is a frequency range that can be used or operated by a radar detection apparatus. In other words, the radar detection apparatus may select a frequency resource in the first frequency band to perform detection.

There are a plurality of cases in which the first frequency band includes M frequency bands.

Figure 17A:
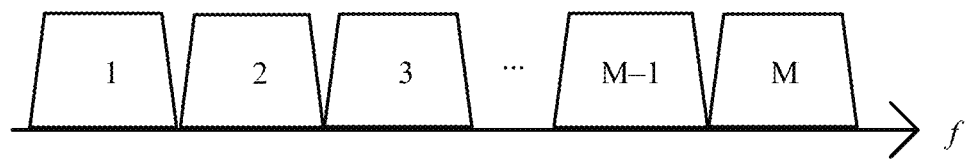
FIG. 17A is a schematic diagram of division of a first frequency band according to an embodiment of this application.

(1) Division of the first frequency band may be evenly non-overlapping, as shown in FIG. 17A. Even means that the first frequency band is divided into the M sub-frequency bands, where bandwidths of all sub-frequency bands are the same. For example, the bandwidths of all the M sub-frequency bands are 200 M. Non-overlapping means that the M sub-frequency bands do not overlap. In other words, there is no common frequency resource part between the M sub-frequency bands. For example, there is no common frequency resource between a second sub-frequency band and a first sub-frequency band and between the second sub-frequency band and a third sub-frequency band. For example, when a frequency band range of the first frequency band is 77 GHz to 81 GHz, every 200 MHz is used as a sub-frequency band, and the first frequency band may be divided into 20 sub-frequency bands. In other words, a value of M is 20, and the 20 sub-frequency bands do not overlap. For example, a frequency domain range of the first sub-frequency band is 77 to 77.2 GHz, a frequency domain range of the second sub-frequency band is 77.2 to 77.4 GHz, and by analogy, a frequency domain range of a twentieth sub-frequency band is 80.8 to 81 GHz.

Figure 17B:
FIG. 17B is another schematic diagram of division of a first frequency band according to an embodiment of this application.

(2) Division of the first frequency band is evenly overlapped, as shown in FIG. 17B. Even means that the first frequency band is divided into the M sub-frequency bands, where bandwidths of all sub-frequency bands are the same.

For example, the bandwidths of all the M sub-frequency bands are 200 M. Overlapping means that there is an overlapping part between adjacent sub-frequency bands. For example, there is a common frequency resource between a second sub-frequency band and a first sub-frequency band. Bandwidths of overlapping parts between the M sub-frequency bands may be the same or different.

Figure 17C:
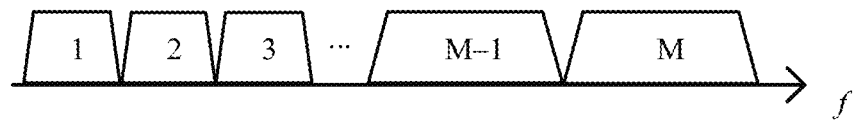
FIG. 17C is another schematic diagram of division of a first frequency band according to an embodiment of this application.

(3) Division of the first frequency band is unevenly non-overlapping, as shown in FIG. 17C. Uneven means that the first frequency band is divided into the M sub-frequency bands, where bandwidths of the M sub-frequency bands are different. Non-overlapping means that the M sub-frequency bands do not overlap. In other words, there is no common frequency resource part between the M sub-frequency bands. For example, there is no common frequency resource between a second sub-frequency band and a first sub-frequency band and between the second sub-frequency band and a third sub-frequency band.

Figure 17D:
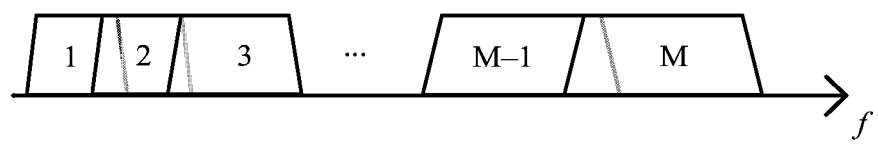
FIG. 17D is another schematic diagram of division of a first frequency band according to an embodiment of this application.

(4) Division of the first frequency band is unevenly overlapped, as shown in FIG. 17D. Uneven means that the first frequency band is divided into the M sub-frequency bands, where bandwidths of the M sub-frequency bands are different. Overlapping means that there is an overlapping part between adjacent sub-frequency bands. For example, there is a common frequency resource between a second sub-frequency band and a first sub-frequency band. Bandwidths of overlapping parts between the M sub-frequency bands may be the same or different.

The foregoing describes only a possibility of dividing first frequency band. A method of dividing the first frequency band is not specifically limited in this application. That the first frequency band is divided into the M sub-frequency bands is used as a reference.

4. Embodiments

Embodiment 1

The following describes a technical solution of an embodiment provided in this application with reference to the accompanying drawings.

Figure 18:
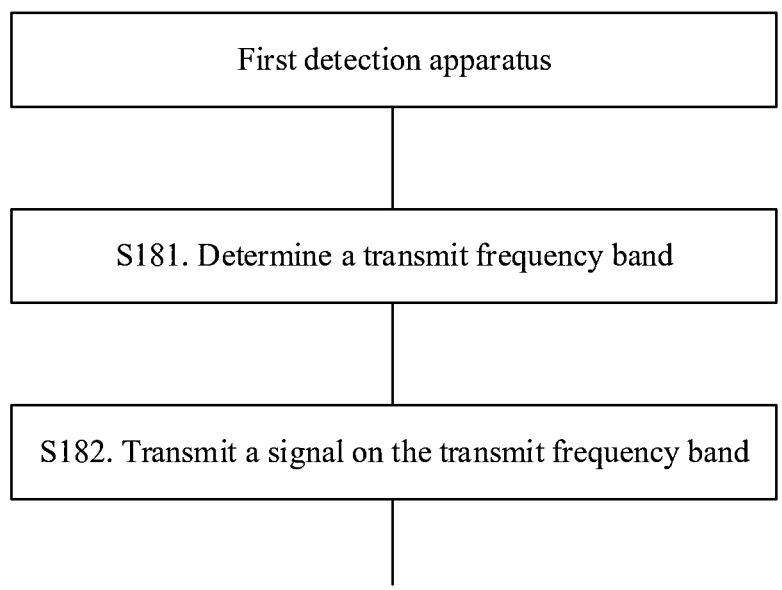
FIG. 18 is a flowchart of a signal transmission method according to an embodiment of this application.

This application provides a signal transmission method. FIG. 18 is a flowchart of the method. In the following description process, an example in which the method is applied to the network architecture shown in FIG. 16 is used.

S181. A first detection apparatus determines a transmit frequency band, where the transmit frequency band includes N sub-frequency bands.

The first detection apparatus may be a radar detection apparatus. For example, the radar detection apparatus may be a radar. For example, the radar may be a millimeter-wave radar. The following uses a radar as an example.

The transmit frequency band is used for the radar to transmit a signal, namely, for the radar to transmit a radar signal.

Figure 19:
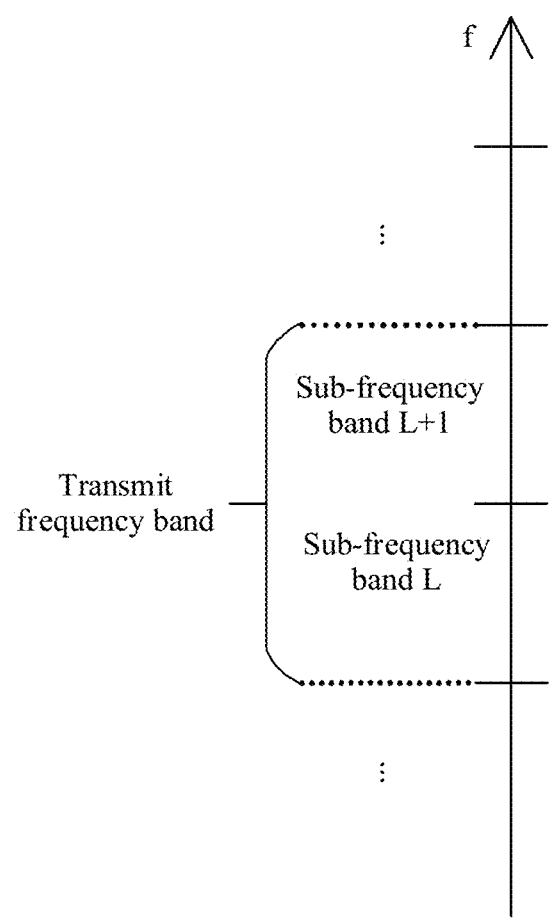
FIG. 19 is a schematic diagram of a transmit frequency band determining method according to an embodiment of this application.

The transmit frequency band includes the N sub-frequency bands, where N is an integer greater than or equal to 1. In other words, a quantity of sub-frequency bands included in the transmit frequency band is N. In other words, the transmit frequency band includes only an integer quantity of sub-frequency bands. As shown in FIG. 19, the transmit frequency band includes a sub-frequency band L and a sub-frequency band L+1, and the transmit frequency band includes two sub-frequency bands.

Figure 20:
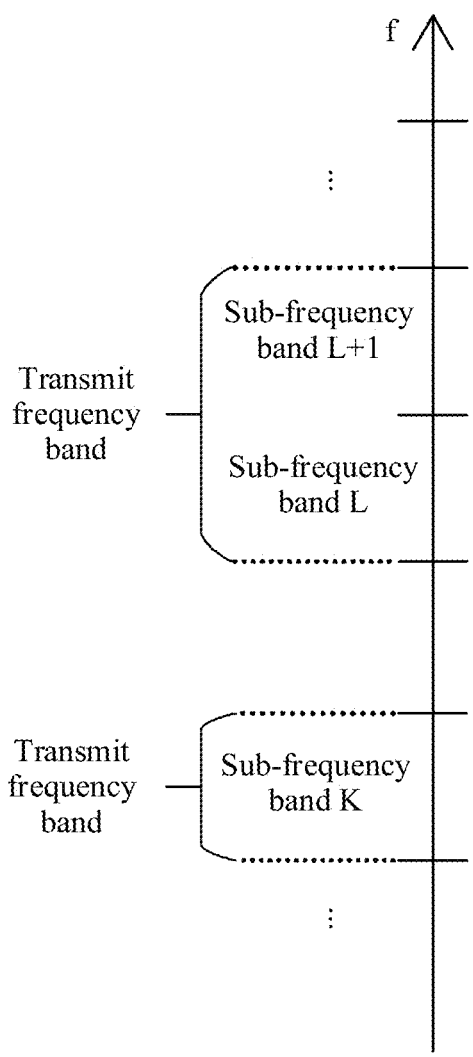
FIG. 20 is another schematic diagram of a transmit frequency band determining method according to an embodiment of this application.

Optionally, the N sub-frequency bands included in the transmit frequency band may be N continuous sub-frequency bands, or may be N discontinuous sub-frequency bands. Continuous herein means that there is no frequency domain spacing between any two adjacent or neighboring sub-frequency bands in the N sub-frequency bands in frequency domain. Discontinuous herein means that there is a frequency domain spacing between at least two adjacent or neighboring sub-frequency bands in the N sub-frequency bands in frequency domain. As shown in FIG. 20, the transmit frequency band includes three sub-frequency bands, and the three sub-frequency bands are not continuous. The transmit frequency band includes the sub-frequency band L, the sub-frequency band L+1, and a sub-frequency band K. The sub-frequency band K is discontinuous with the sub-frequency band L and the sub-frequency band L+1. The method of determining the transmit frequency band can be used for a radar whose transmit signal is in a multi-frequency band range.

The determining of the transmit frequency band meets the following conditions:

1. A bandwidth of the transmit frequency band is not less than an operating bandwidth of the first detection apparatus. The operating bandwidth of the first detection apparatus refers to a bandwidth occupied by a waveform of a transmitted signal.

Figure 21:
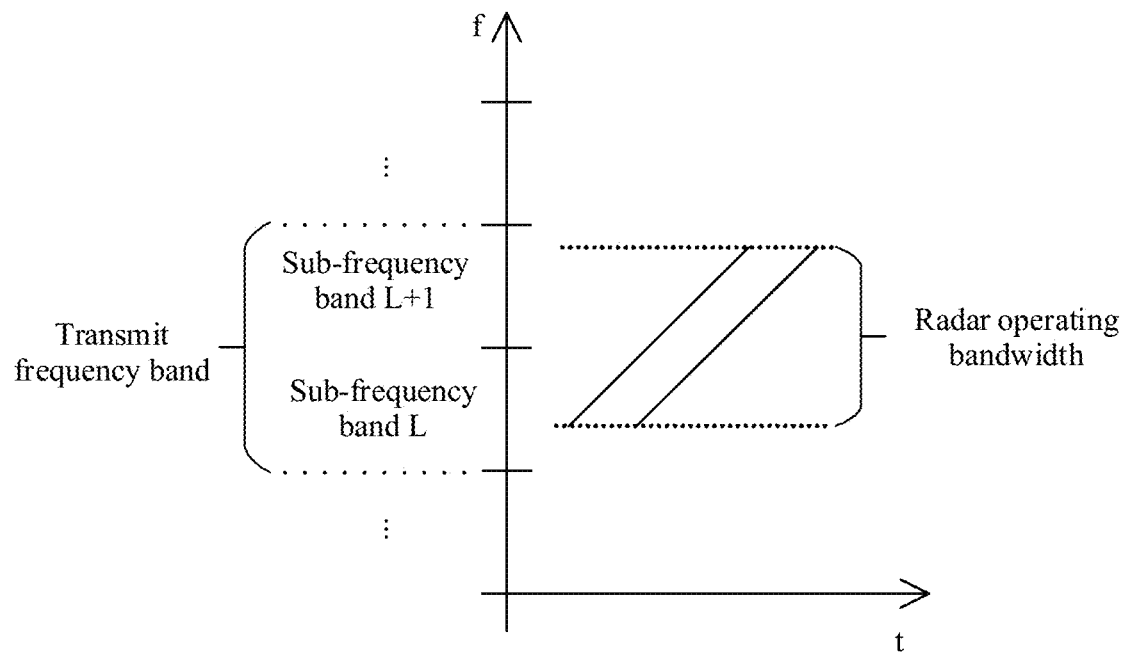
FIG. 21 is a schematic diagram of a relationship between a transmit frequency band and a radar operating bandwidth according to an embodiment of this application.

As shown in FIG. 21, the transmit frequency band includes the sub-frequency band L and the sub-frequency band L+1, namely, the transmit bandwidth includes two sub-frequency bands. The bandwidth of the transmit frequency band is a sum of bandwidths of the sub-frequency band L and the sub-frequency band L+1. The operating bandwidth of the radar is less than the sum of the bandwidths of the sub-frequency band L and the sub-frequency band L+1. The bandwidth of the transmit frequency band is greater than or equal to the operating bandwidth of the radar.

2. A sum of bandwidths of any N−1 sub-frequency bands in the N sub-frequency bands is less than the operating bandwidth of the first detection apparatus.

Figure 22:
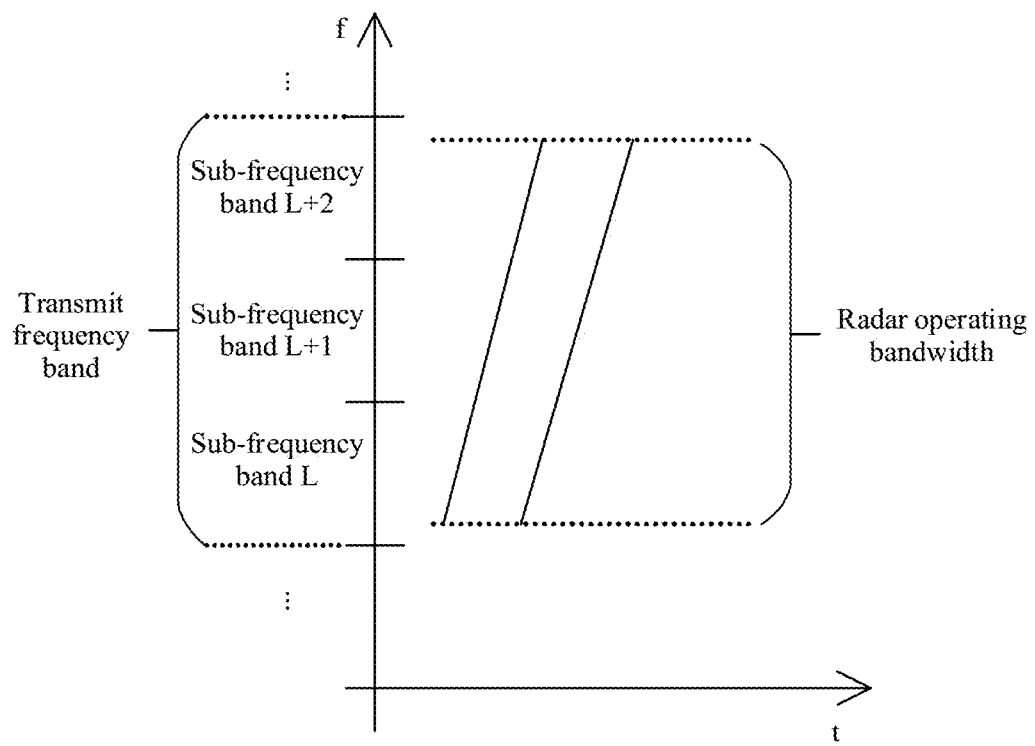
FIG. 22 is another schematic diagram of a relationship between a transmit frequency band and a radar operating bandwidth according to an embodiment of this application.
Figure 23B:
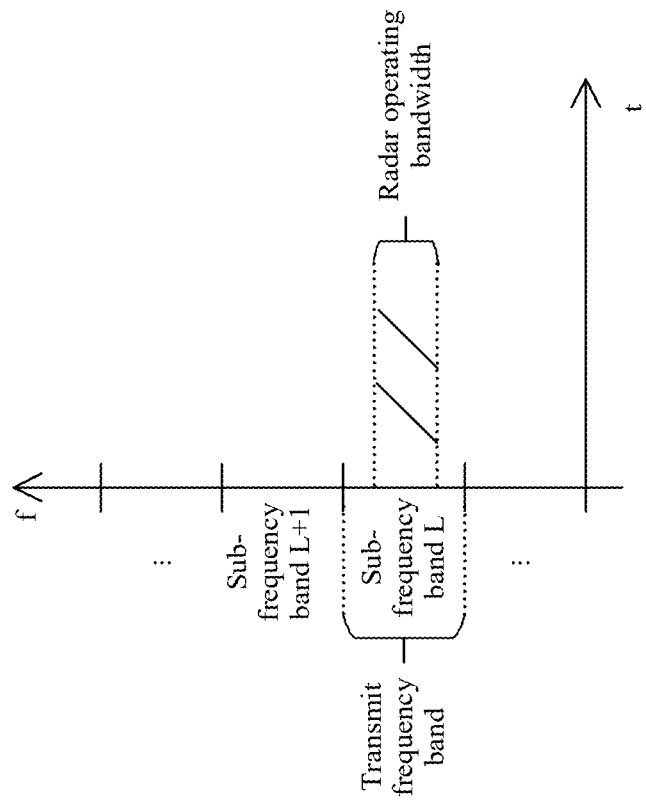
FIG. 23B is another schematic diagram of a relationship between a transmit frequency band and a radar operating bandwidth according to an embodiment of this application.
Figure 23A:
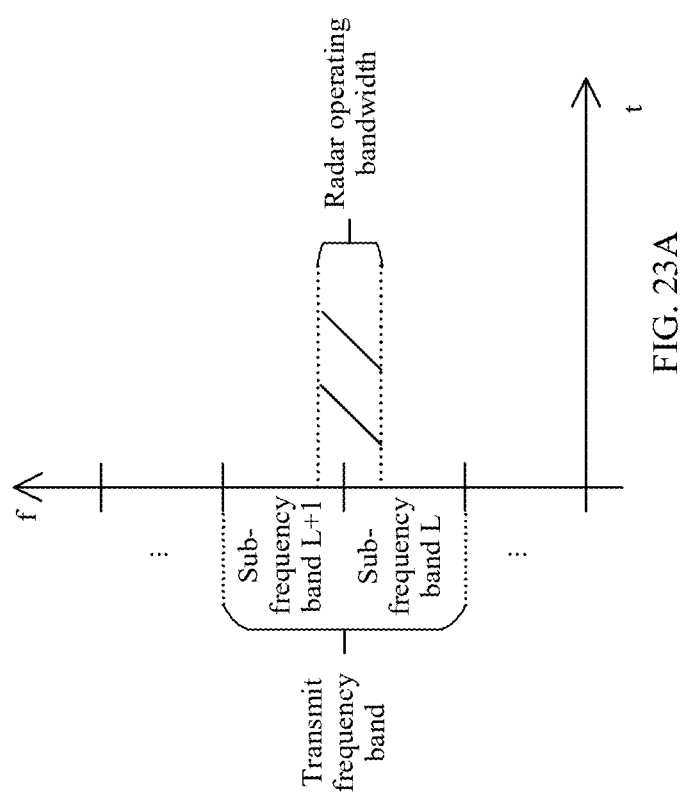
FIG. 23A is a schematic diagram of inconsistency of a relationship between a transmit frequency band and a radar operating bandwidth according to an embodiment of this application.

As shown in FIG. 21, the transmit frequency band includes two sub-frequency bands, where the bandwidth of any one of the two sub-frequency bands is less than the operating bandwidth of the radar. As shown in FIG. 22, the transmit frequency band includes three sub-frequency bands. A sum of bandwidths of any two sub-frequency bands is less than the operating bandwidth of the radar. The bandwidth of the transmit frequency band is greater than or equal to the operating bandwidth of the radar. As shown in FIG. 23A, the transmit frequency band includes two sub-frequency bands. However, because both the bandwidth of the sub-frequency band L and the bandwidth of the sub-frequency band L+1 are greater than the operating bandwidth of the radar, selection of the transmit frequency band in FIG. 23A does not meet the condition. In FIG. 23B, the transmit frequency band includes one sub-frequency band, namely, the sub-frequency band L. The bandwidth of the transmit frequency band is greater than the operating bandwidth of the radar, and the operating bandwidth of the radar is greater than a bandwidth of 0 sub-frequency bands. Therefore, the selection of the transmit frequency band in FIG. 23B meets the condition.

In other words, when the operating bandwidth of the radar is greater than the sum of the bandwidths of any N−1 sub-frequency bands and is less than or equal to a sum of bandwidths of the N sub-frequency bands, the transmit frequency band is the N sub-frequency bands, and cannot be N+1 sub-frequency bands.

The N sub-frequency bands belong to a first frequency band, and the first frequency band is a frequency band for operation of the first detection apparatus. A plurality of first detection apparatuses may separately select a corresponding transmit frequency band in the first frequency band to transmit a signal.

The first frequency band includes M sub-frequency bands, where N is less than or equal to M, and N and M are integers greater than or equal to 1. The M sub-frequency bands in the first frequency band may be divided using a plurality of methods. For details, refer to the foregoing descriptions. The N sub-frequency bands belong to the first frequency band, and N is less than or equal to M. Therefore, the transmit frequency band is in one or more sub-frequency bands of the first frequency band. A transmit signal of the first detection apparatus is transmitted on an integer quantity of sub-frequency bands, and does not occupy other sub-frequency band. In this way, the another sub-frequency bands in the first frequency band may be fully used by another detection apparatus to transmit a signal. Therefore, resource utilization of the first frequency band can be improved.

Optionally, a frequency domain range of the first frequency band is predefined or pre-specified. The frequency domain range of the first frequency band may be predefined in an industry standard. The industry standard is not limited herein. For example, a frequency domain range of a first frequency domain may be 77 GHz to 81 GHz, where GHz refers to gigahertz. For another example, a frequency domain range of a first frequency domain may alternatively be another frequency domain range. This application merely provides an example. The frequency domain range of the first frequency band may alternatively be pre-specified by a law. The specific law is not limited herein.

Optionally, division of the M sub-frequency bands is predefined. The division of the M sub-frequency bands may be predefined in the industry standard, and the M sub-frequency bands may be divided using the plurality of methods.

In an optional design, different radar manufacturers may specify, based on the frequency domain range of the first frequency band and a division method of the M sub-frequency bands, the transmit frequency band used when the radar transmits a signal. In other words, the radar needs to comply with factory settings when transmitting the signal. Alternatively, a transmit frequency band of at least one type of the radar or at least one radar is specified in a standard, and an operating frequency band of a radar of each vendor is specified. It should be noted herein that there may be another option for the method of determining the transmit frequency band by the radar. For example, detecting an idle frequency resource part and selecting the idle frequency resource part as the transmit frequency band. This is not limited herein.

It should be understood that the sub-frequency band L, the sub-frequency band L+1, a sub-frequency band L+2, and the sub-frequency band K mentioned above are a representation of the sub-frequency band.

S182. The first detection apparatus transmits the signal on the transmit frequency band.

Neither an upper boundary nor a lower boundary of a frequency resource occupied by the transmit signal exceeds the transmit frequency band.

As shown in FIG. 22, the transmit frequency band includes three sub-frequency bands: the sub-frequency band L, the sub-frequency band L+1, and the sub-frequency band L+2. Both the upper boundary and the lower boundary of the frequency band occupied by the transmit signal of the radar are in the transmit frequency band. In other words, the upper boundary of the frequency band occupied by the transmit signal of the radar does not exceed an upper boundary of the sub-frequency band L+2, and the lower boundary of the frequency band occupied by the transmit signal of the radar does not exceed a lower boundary of the sub-frequency band L.

In this embodiment of this application, the first detection apparatus determines that the N sub-frequency bands in the first frequency band are transmit frequency bands, the operating bandwidth of the first detection apparatus is less than or equal to the bandwidth of the transmit frequency band, and the sum of the bandwidths of any N−1 sub-frequency bands in the N sub-frequency bands is less than the operating bandwidth of the first detection apparatus. In this way, the N sub-frequency bands of the M sub-frequency bands in the first frequency band are determined as the transmit frequency band of the first detection apparatus. This standardizes the transmit frequency band of the first detection apparatus, avoids randomization, improves the resource utilization of the first frequency band, and further reduces interference between first detection apparatuses.

Embodiment 2

The following describes a technical solution of an embodiment provided in this application with reference to the accompanying drawings.

Another signal transmission method provided in this application is described as follows. FIG. 18 is a flowchart of the method. In the following description process, an example in which the method is applied to the network architecture shown in FIG. 16 is used.

S181. A first detection apparatus determines a transmit frequency band, where the transmit frequency band includes N sub-frequency bands.

For understanding of this step, refer to S181 in Embodiment 1. Details are not described herein again.

The step of determining the transmit frequency band may further include detecting some frequency bands in a first frequency band. A specific implementation is as follows.

Optionally, the method of determining the transmit frequency band may further include: A first detection frequency band in a plurality of detection frequency bands is determined as the transmit frequency band. Herein, a radar determines the transmit frequency band by detecting the first frequency band. A specific form of detecting the first frequency band by the radar may be listening, or may be another form. For example, receiving frequency band usage information sent by a road side unit or another device. The following describes an example in which the radar listens on the plurality of detection frequency bands.

The detection frequency band is a frequency band in the first frequency band. The radar may detect the detection frequency band to determine the transmit frequency band. Optionally, the radar may determine the plurality of detection frequency bands based on an operating bandwidth, and select a detection frequency band with optimal quality as the transmit frequency band.

Specifically, a method in which the radar determines the plurality of detection frequency bands may be pre-configured, may be determined by the radar, or may be indicated by another device. Further, the indicating by another device may be obtaining indication information from a base station or a road side unit by using the another device. A type of the another device is not limited herein.

A frequency domain range of each detection frequency band in the plurality of detection frequency bands is less than or equal to a frequency domain range of the first frequency band. The plurality of detection frequency bands may or may not overlap. This is not limited herein. Each detection frequency band includes a positive integer of sub-frequency bands. In other words, each detection frequency band may include one or more sub-frequency bands. Different detection frequency bands may include different quantities of sub-frequency bands. In other words, bandwidths of different detection frequency bands may be different. The plurality of detection frequency bands include the first detection frequency band. The first detection frequency band is one of the detection frequency bands, and a bandwidth range of the first detection frequency band is greater than or equal to the operating bandwidth of the radar. Specifically, because the transmit frequency band is from the plurality of detection frequency bands, it may be understood that the plurality of detection frequency bands are candidate frequency bands of the transmit frequency band. In this case, each detection frequency band in the plurality of detection frequency bands also needs to meet the following conditions:

1. A bandwidth of each detection frequency band is not less than the operating bandwidth of the first detection apparatus.

2. For any detection frequency band in the plurality of detection frequency bands, if a quantity of sub-frequency bands included in the detection frequency band is Q, a sum of bandwidths of any Q−1 sub-frequency bands in the detection frequency band is less than the operating bandwidth of the first detection apparatus, and Q is a positive integer.

Figure 24:
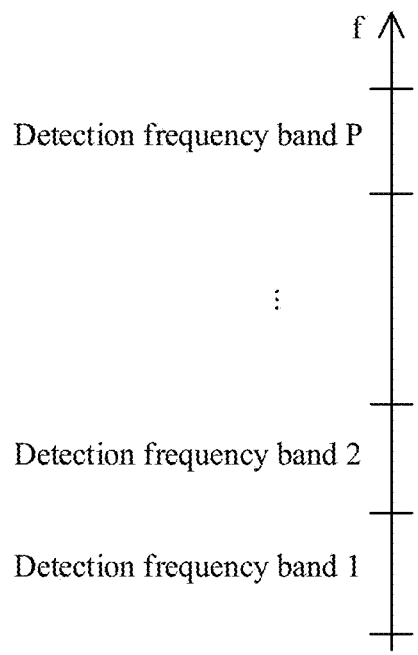
FIG. 24 is a schematic diagram of a plurality of detection frequency bands according to an embodiment of this application.

Optionally, the radar may detect each detection frequency band in the plurality of detection frequency bands in an order. The order may be an ascending order or descending order of the center frequencies of the detection frequency band, a random selection order, a preset listening order, or the like. The following describes an example in which center frequencies of the detection frequency band are in an ascending order, as shown in FIG. 24. The radar may detect P detection frequency bands in an order in which a center frequency of each detection frequency band increases, where P is a positive integer. A frequency of a center frequency of a detection frequency band 1 is $f_1$, a frequency of a center frequency of a detection frequency band 2 is $f_2$, and by analogy, a frequency of a center frequency of a detection frequency band P is $f_P$, and $f_1 < f_2 < \ldots < f_P$. A direction of an arrow in the figure represents a direction in which the frequency increments. The radar sequentially detects the detection frequency bands 1 to P, and obtains a detection result.

Optionally, the radar may simultaneously perform detection on each detection frequency band in the plurality of detection frequency bands, and obtain a detection result. For example, as shown in FIG. 24, the radar simultaneously detects P detection frequency bands.

A specific method of selecting the first detection frequency band may include the following.

Optionally, a priority of the first detection frequency band is not lower than a priority of a detection frequency band other than the first detection frequency band in the plurality of detection frequency bands. The priority may be divided based on a value of the center frequency of each detection frequency band. For example, a detection frequency band with a relatively low center frequency is selected as the transmit frequency band. This reduces power consumption. In this embodiment, the center frequency may be replaced with a lowest frequency, a highest frequency, or another form. This is not limited herein. The priority may be divided based on the detection result of the plurality of detection frequency bands. For example, based on the detection result, idle degrees of the plurality of detection frequency bands may be determined, or energy values of the plurality of detection frequency bands may be determined, or may be determined in another manner. In addition, a detection frequency band with a relatively high idle degree is selected as a detection frequency band with a relatively high priority, or a frequency band with a relatively low energy value is selected as the detection frequency band with the relatively high priority. Then, a first detection frequency band with a highest priority is selected as the transmit frequency band. A manner of selecting the priority herein may also be a combination of any of the foregoing factors. For example, a detection frequency band with a lowest center frequency and a lowest energy value is selected as the transmit frequency band. This is not limited herein. In this way, the first detection frequency band with the highest priority in the plurality of detection frequency bands is determined as the transmit frequency band. For example, the first detection frequency band is determined by using values of center frequencies of the plurality of detection frequency bands. This can reduce power consumption. For example, a first detection frequency band with a highest idle degree is determined as the transmit frequency band. This can improve resource utilization, avoid overlapping between the transmit frequency band of the first detection apparatus and a transmit frequency band of another first detection apparatus, and reduce or avoid interference between first detection apparatuses.

Optionally, an idle degree of the first detection frequency band is not lower than an idle degree of a detection frequency band other than the first detection frequency band in the plurality of detection frequency bands. An idle degree of the detection frequency band may be determined based on the foregoing detection result. A specific detection result may be an energy value of each detection frequency band or another representation. A detection frequency band with a relatively low energy value is used as a frequency band with a relatively high idle degree. Specifically, a first detection frequency band with a highest idle degree in the plurality of detection frequency bands may be determined as the transmit frequency band. Alternatively, a detection frequency band with a higher idle degree than a preset idle degree threshold is selected as the first detection frequency band by comparing the detection result with the preset idle degree threshold. If there are a plurality of detection frequency bands with the highest idle degree, the detection frequency band is randomly selected from the plurality of detection frequency bands or the detection frequency band is selected based on a detection frequency band with a lowest center frequency, as the first detection frequency band. The first detection frequency band with the highest idle degree is determined as the transmit frequency band. This can improve resource utilization, reduce or avoid overlapping between the transmit frequency band of the first detection apparatus and a transmit frequency band of another first detection apparatus, and reduce or avoid interference between first detection apparatuses.

Optionally, an energy value of the first detection frequency band is not greater than an energy value of a detection frequency band other than the first detection frequency band in the plurality of detection frequency bands. The energy value of the detection frequency band may be obtained based on the foregoing detection result. A first detection frequency band with a lowest energy value is used as the transmit frequency band. The first detection frequency band with the lowest energy value is determined as the transmit frequency band. In other words, a first detection frequency band with lowest utilization is determined as the transmit frequency band. This can reduce or avoid overlapping between the transmit frequency band of the first detection apparatus and a transmit frequency band of another first detection apparatus, and reduce or avoid interference between first detection apparatuses.

Figure 25:
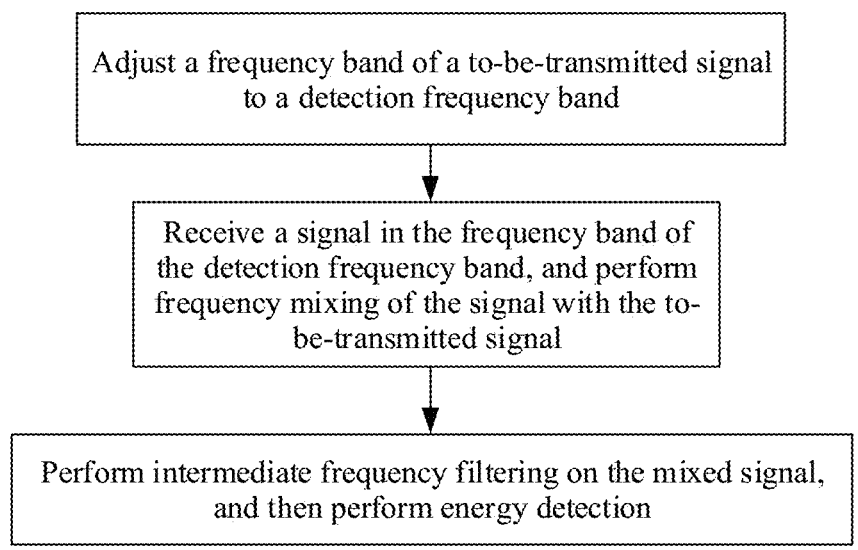
FIG. 25 is a flowchart of energy detection according to an embodiment of this application.

Optionally, the energy value of the detection frequency band is determined by detecting a signal received on the detection frequency band. The following provides a possible energy detection process of the radar for a specific detection frequency band, as shown in FIG. 25. This application is merely an example. In an actual application process, there may be another energy detection method. This is not limited herein. First, the radar adjusts a frequency band of a to-be-transmitted signal to a range of the detection frequency band. The to-be-transmitted signal herein refers to a signal to be transmitted in the transmit frequency band that is selected by the radar. Then, a receiver receives a signal in the frequency band of the detection frequency band, performs frequency mixing of the signal with the to-be-transmitted signal, and finally performs intermediate frequency filtering on a signal obtained after the frequency mixing, and then performs energy detection based on a final filtering result. The energy value may indicate utilization of the detection frequency band. The energy value may be an energy value obtained by performing the energy detection on the detection frequency band, or may be an average power value obtained by performing the energy detection on the detection frequency band. This is not limited herein. Specifically, the energy value is signal energy of an intermediate frequency signal obtained after signal processing from the detection frequency band, for example, signal energy within a time window, and/or the average power value is an average power obtained based on the intermediate frequency signal obtained after the signal processing from the detection frequency band, for example, an average power within a time window. A person skilled in the art may know that the signal energy and the average power may be obtained with reference to a calculation method or rule. This is not specifically limited herein.

Optionally, the method of determining the transmit frequency band may further include: Whether the first detection frequency band is idle is determined. Herein, the bandwidth range of the first detection frequency band is greater than or equal to the operating bandwidth of the radar. The radar detects one detection frequency band at a specific moment. In other words, the radar detects the first detection frequency band. For a specific detection process, refer to the foregoing descriptions. When the first detection frequency band is detected to be idle, the first detection frequency band is determined as the transmit frequency band. When the first detection frequency band is detected to be not idle, whether a second detection frequency band is idle is determined. The second detection frequency band is a detection frequency band different from the first detection frequency band. Whether the first detection frequency band is the transmit frequency band is determined by detecting whether the first detection frequency band is idle. This can improve resource utilization, reduce or avoid overlapping between the transmit frequency band of the first detection apparatus and a transmit frequency band of another first detection apparatus, reduce or avoid interference between first detection apparatuses, and reduce detection power consumption.

Optionally, the determining whether the first detection frequency band is idle includes: An energy value of the first detection frequency band is determined. The energy value of the first detection frequency band is determined by detecting a signal received on the first detection frequency band. A process of detecting the energy value is the same as the foregoing descriptions. Herein, whether the first detection frequency band is idle is determined by setting a preset value. To be specific, when the energy value of the first detection frequency band is less than the preset value, that the first detection frequency band is idle is determined. When the energy value of the first detection frequency band is greater than the preset value, that the first detection frequency band is not idle is determined. The energy value of the first detection frequency band is determined by detecting the signal on the first frequency band. A detection frequency band whose energy value is less than the preset value is determined as the transmit frequency band. In other words, a detection frequency band whose utilization is less than the preset value is selected as the transmit frequency band. This can reduce or avoid overlapping between the transmit frequency band of the first detection apparatus and a transmit frequency band of another first detection apparatus, and reduce or avoid interference between first detection apparatuses.

S182. The first detection apparatus transmits the signal on the transmit frequency band.

For understanding of this step, refer to S181 in Embodiment 1. Details are not described herein again.

It may be understood that, to implement the foregoing functions, each apparatus, such as the first detection apparatus, includes corresponding hardware structures and/or software modules for performing the functions. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of this application.

In the embodiments of this application, the first apparatus may be divided into functional modules. For example, each function module may be obtained through division based on each corresponding function, or two or more functions may be integrated into one functional module. The integrated module may be implemented in a form of hardware, or may be implemented in a form of a software functional module. It should be noted that the division of the modules in the embodiments of this application is an example, and is merely a logical function division. In actual implementation, another division manner may be used.

Figure 26:
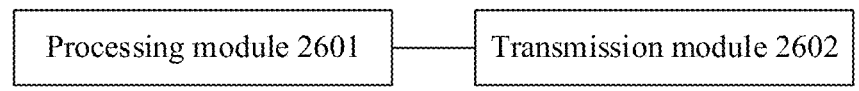
FIG. 26 is a schematic diagram of a first structure of a first detection apparatus according to an embodiment of this application.

For example, when the functional modules of the first apparatus are obtained through division in an integrated manner. FIG. 26 is a schematic diagram of a possible structure of the first apparatus in the foregoing embodiments of this application. The first detection apparatus 26 may include a processing module 2601 and a transmission module 2602. The processing module 2601 may be configured to perform all operations, except transmitting and receiving operations, performed by the first detection apparatus in the embodiment shown in FIG. 18, for example, S181, and/or support another process of the technology described in this specification. The transmission module 2602 may be configured to perform all transmitting operations performed by the first detection apparatus in the embodiment shown in FIG. 18, for example, S182, and/or support another process of the technology described in this specification. The transmission module may alternatively be replaced with a transceiver module, and the transceiver module may be configured to support another process of the technology described in this specification.

The processing module 2601 is configured to determine a transmit frequency band, where the transmit frequency band includes N sub-frequency bands.

The transmission module 2602 is configured to transmit a signal on the transmit frequency band, where a bandwidth of the transmit frequency band is not less than an operating bandwidth of the first detection apparatus.

A sum of bandwidths of any N−1 sub-frequency bands in the N sub-frequency bands is less than the operating bandwidth of the first detection apparatus. The N sub-frequency bands belong to a first frequency band. The first frequency band includes M sub-frequency bands, where N is less than or equal to M, and N and M are integers greater than or equal to 1.

In an optional implementation, a frequency domain range of the first frequency band is predefined or pre-specified.

In an optional implementation, division of the M sub-frequency bands is predefined.

In an optional implementation, the processing module is configured to determine a first detection frequency band in a plurality of detection frequency bands as the transmit band. A priority of the first detection frequency band is not lower than a priority of a detection frequency band other than the first detection frequency band in the plurality of detection frequency bands.

In an optional implementation, the processing module is configured to determine a first detection frequency band in a plurality of detection frequency bands as the transmit frequency band. An idle degree of the first detection frequency band is not lower than an idle degree of a detection frequency band other than the first detection frequency band in the plurality of detection frequency bands.

In an optional implementation, the processing module is configured to determine a first detection frequency band in the plurality of detection frequency bands as the transmit frequency band. An energy value of the first detection frequency band is not higher than an energy value of a detection frequency band other than the first detection frequency band in the plurality of detection frequency bands.

In an optional implementation, the energy value of the detection frequency band is determined by detecting a signal of the detection frequency band.

In an optional implementation, the processing module is configured to determine whether a first detection frequency band is idle. When the first detection frequency band is idle, the processing module is further configured to determine the first detection frequency band as the transmit frequency band. When the first detection frequency band is not idle, the processing module is further configured to determine whether a second detection frequency band is idle.

In an optional implementation, the processing module is configured to determine an energy value of the first detection frequency band. The energy value of the first detection frequency band is determined by detecting a signal of the first detection frequency band. When the energy value of the first detection frequency band is less than a preset value, the processing module is configured to determine that the first detection frequency band is idle. When the energy value of the first detection frequency band is greater than a preset value, the processing module is configured to determine that the first detection frequency band is not idle.

Figure 27:
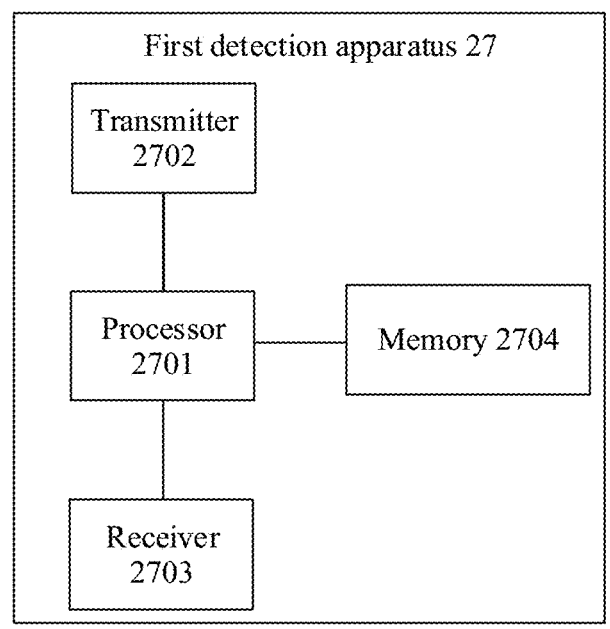
FIG. 27 is a schematic diagram of a second structure of a first detection apparatus according to an embodiment of this application.

FIG. 27 is a schematic diagram of another possible structure of a first detection apparatus according to an embodiment of this application. The first detection apparatus 27 may include at least one processor 2701 and one transmitter 2702. Functions of the processor 2701 and the transmitter 2702 may be respectively corresponding to specific functions of the processing module 2601 and the transmission module 2602 shown in FIG. 26. Details are not described herein again. Optionally, the first detection apparatus 27 may further include a memory 2704, configured to store a program instruction and/or data for the processor 2701 to read.

Figure 28:
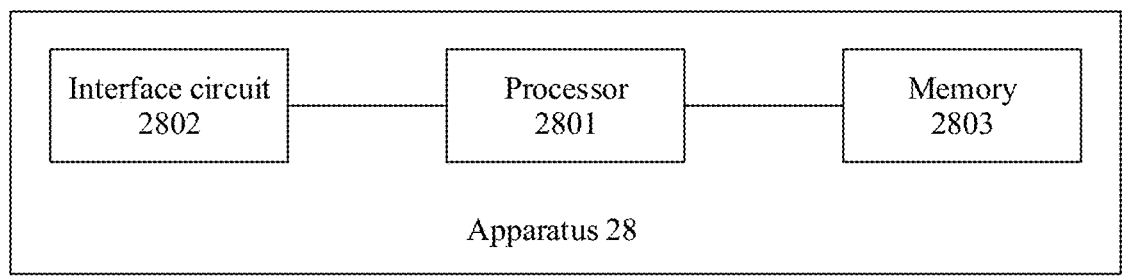
FIG. 28 is a schematic diagram of a third structure of a first detection apparatus according to an embodiment of this application.

FIG. 28 is a schematic diagram of a structure of an apparatus 28 according to an embodiment of this application. The apparatus 28 shown in FIG. 28 may be the first detection apparatus, or may be a chip or a circuit capable of implementing a function of the first detection apparatus. For example, the chip or the circuit may be disposed in the first detection apparatus. The apparatus 28 shown in FIG. 28 may include at least one processor 2801 (for example, the processing module 2601 may be implemented by using the processor 2801, and the processor 2701 and the processor 2801 may be, for example, a same component) and one interface circuit 2802. The processor 2801 implements the steps in the method provided in the embodiment shown in FIG. 18. Optionally, the apparatus 28 may further include a memory 2803. The memory 2803 may be configured to store an instruction. The processor 2801 executes the instruction stored in the memory 2803, to enable the apparatus 28 to implement the steps in the method provided in the embodiment shown in FIG. 18.

Further, the processor 2801, the interface circuit 2802, and the memory 2803 may communicate with each other through an internal connection path, to transfer a control signal and/or a data signal. The memory 2803 is configured to store a computer program. The processor 2801 may invoke the computer program from the memory 2803 and run the computer program, to control the interface circuit 2802 to receive or transmit a signal. Alternatively, the processor 2801 invokes the computer program from the memory 2803 and runs the computer program by using the interface circuit 2802, to implement the steps performed by the first apparatus in the method provided in the embodiment shown in FIG. 18. The memory 2803 may be integrated into the processor 2801, or may be disposed separately from the processor 2801.

Optionally, if the apparatus 28 is a device, the interface circuit 2802 may include a receiver and a transmitter. The receiver and the transmitter may be a same component, or may be different components. When the receiver and the transmitter are the same component, the component may be referred to as a transceiver.

Optionally, if the apparatus 28 is the chip or the circuit, the interface circuit 2802 may include an input interface and an output interface. The input interface and the output interface may be a same interface, or may be different interfaces.

Optionally, if the apparatus 28 is the chip or the circuit, the apparatus 28 may not include the memory 2803. The processor 2801 may read an instruction (a program or code) in a memory outside the chip or the circuit, to implement the steps performed by the first apparatus in the method provided in the embodiment shown in FIG. 18.

Optionally, if the apparatus 28 is the chip or the circuit, the apparatus 28 may include a resistor, a capacitor, or another corresponding functional component. The processor 2801 or the interface circuit 2802 may be implemented by using a corresponding functional component.

In an implementation, a function of the interface circuit 2802 may be considered to be implemented by using a transceiver circuit or a dedicated transceiver chip. It may be considered that the processor 2801 is implemented by using a dedicated processing chip, a processing circuit, a processor, or a general-purpose chip.

In another implementation, it may be considered that the first apparatus provided in the embodiments of this application is implemented by using a general-purpose computer. To be specific, program code for implementing functions of the processor 2801 and the interface circuit 2802 is stored in the memory 2803, and the processor 2801 implements the functions of the processor 2801 and the interface circuit 2802 by executing the program code stored in the memory 2803.

Functions and actions of the modules or units in the apparatus 28 listed above are merely examples for description. The functional units in the apparatus 28 may be configured to perform actions or processing processes performed by the first apparatus in the embodiment shown in FIG. 18. To avoid repetition, detailed descriptions thereof are omitted herein.

An embodiment of this application further provides a radar system, configured to provide a detection function for a vehicle. The radar system includes at least one detection apparatus mentioned in the foregoing embodiments of this application. The at least one detection apparatus in the system may be integrated into an entire system or a device, or the at least one detection apparatus in the system may be independently disposed as an element or an apparatus.

An embodiment of this application further provides a sensor system, configured to provide a detection function for a vehicle. The sensor system includes at least one detection apparatus mentioned in the foregoing embodiments of this application, and at least one of a camera, a laser radar and other sensors. The at least one sensor apparatus in the system may be integrated into an entire system or a device, or the at least one sensor apparatus in the system may be independently disposed as an element or an apparatus.

An embodiment of this application further provides a system applied to unmanned driving or intelligent driving. The system includes at least one of a detection apparatus, a sensor such as a camera, and a fusion module that are mentioned in the foregoing embodiments of this application. The at least one apparatus in the system may be integrated into an entire system or a device, or the at least one apparatus in the system may be independently disposed as an element or an apparatus.

Further, any of the above systems may interact with a central controller of the vehicle to provide detection and/or fusion information for decision or control of driving of the vehicle.

An embodiment of this application further provides a vehicle. The vehicle includes at least one detection apparatus mentioned in the foregoing embodiments of this application, or includes any one of the foregoing systems.

In still another optional implementation, when the first detection apparatus is implemented by using software, all or some of the first detection apparatus may be implemented in a form of a computer program product. The computer program product includes one or more computer instructions. When the computer program instructions are loaded and executed on a computer, the procedure or functions according to the embodiments of this application are all or partially implemented. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid-state drive or solid-state disk (SSD)), or the like.

It should be noted that the processor included in the first detection apparatus configured to perform the communications method provided in the embodiments of this application may be one or more processors. The one or more processors may be a central processing unit (CPU), a general-purpose processor, a digital signal processor (DSP), an application-specific integrated circuit (ASIC), a field-programmable gate array (FPGA), another programmable logic device, a transistor logic device, a hardware component, or any combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor. Alternatively, if the first detection apparatus is a processing apparatus, the processing apparatus may be a CPU, a general-purpose processor, a DSP, an ASIC, an FPGA or another programmable logic device, a transistor logic device, a hardware component, or any combination thereof. The processor may implement or execute various example logical blocks, modules, and circuits described with reference to content disclosed in this application. Alternatively, the processing apparatus may be a combination of processors implementing a computing function, for example, a combination of one or more microprocessors, or a combination of the DSP and a microprocessor.

Methods or algorithm steps described in combination with the embodiments of this application may be implemented by hardware, or may be implemented by a processor executing a software instruction. The software instruction may include a corresponding software module. The software module may be stored in a random-access memory (RAM), a flash memory, a read-only memory (ROM) memory, an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to a processor, so that the processor can read information from the storage medium and write information into the storage medium. Certainly, the storage medium may be a component of the processor. The processor and the storage medium may be located in an ASIC. In addition, the ASIC may be located in the first apparatus. Certainly, the processor and the storage medium may exist in the first detection apparatus as discrete components.

It may be understood that FIG. 26 to FIG. 28 show merely simplified designs of the first detection apparatus. In an actual application, the first detection apparatus may include any quantity of transmitters, receivers, processors, controllers, memories, and other elements that may exist.

The foregoing descriptions about implementations allow a person skilled in the art to understand that, for the purpose of convenient and brief description, division of the foregoing function modules is used as an example for illustration. In actual application, the foregoing functions can be allocated to different functional modules and implemented based on a requirement. In other words, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may be one or more physical units, may be located in one position, or may be distributed in different positions. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application may be implemented in a form of a software product. The software product is stored in a storage medium and includes several instructions for instructing a device (which may be a single-chip microcomputer, a chip or the like) or a processor to perform all or some of the steps of the methods described in the embodiments of this application. The foregoing storage medium includes: any medium that can store program code, such as a USB flash drive, a removable hard disk, a ROM, a RANI, a magnetic disk, or an optical disc.

The foregoing descriptions are merely specific implementations of the embodiments of this application, but are not intended to limit the protection scope of the embodiments of this application. Any variation or replacement within the technical scope disclosed in this application shall fall within the protection scope of the embodiments of this application. Therefore, the protection scope of the embodiments of this application shall be subject to the protection scope of the claims.

What is claimed is:

1. A method, comprising:
   obtaining a preset transmit frequency band comprising a first transmit frequency bandwidth, wherein the preset transmit frequency band comprises N sub-frequency bands, and wherein a first sum of bandwidths of the N sub-frequency bands is equal to the first transmit frequency bandwidth;
   selecting, based on the preset transmit frequency band, an operating bandwidth of a first detection apparatus, wherein the operating bandwidth is occupied by a waveform of a signal transmitted by the first detection apparatus, wherein the operating bandwidth is greater than a second sum of bandwidths of N−1 of the N sub-frequency bands and is less than the first sum of bandwidths of the N sub-frequency bands, and wherein the operating bandwidth comprises a total bandwidth of the N−1 of the N sub-frequency bands and a portion of a bandwidth of one of the N sub-frequency bands; and
   transmitting, on the operating bandwidth, a first signal.

2. The method of claim 1, wherein a frequency domain range of the preset transmit frequency band is predefined.

3. The method of claim 1, wherein distribution of the N sub-frequency bands in the preset transmit frequency band satisfies a predefined or pre-configured rule.

4. The method of claim 1, wherein obtaining the preset transmit frequency band comprises identifying a first detection frequency band in a plurality of detection frequency bands as the preset transmit frequency band, and wherein a first priority of the first detection frequency band is not lower than a second priority of a second detection frequency band in the plurality of detection frequency bands other than the first detection frequency band.

5. The method of claim 1, wherein obtaining the preset transmit frequency band comprises identifying a first detection frequency band in a plurality of detection frequency bands as the transmit frequency band, and wherein a first idle degree of the first detection frequency band is not lower than a second idle degree of a second detection frequency band in the plurality of detection frequency bands other than the first detection frequency band.

6. The method of claim 1, wherein obtaining the preset transmit frequency band comprises identifying a first detection frequency band in a plurality of detection frequency bands as the transmit frequency band, and wherein a first energy value of the first detection frequency band is not greater than a second energy value of a second detection frequency band in the plurality of detection frequency bands other than the first detection frequency band.

7. The method of claim 6, further comprising obtaining the first energy value by detecting a second signal that is received on the first detection frequency band.

8. The method of claim 1, wherein obtaining the preset transmit frequency band comprises:
   detecting whether a first detection frequency band is idle;
   selecting, when the first detection frequency band is idle, the first detection frequency band as the preset transmit frequency band; and
   selecting, when the first detection frequency band is not idle, the preset transmit frequency band as a second detection frequency band that is idle.

9. The method of claim 8, wherein detecting whether the first detection frequency band is idle comprises:
   obtaining an energy value of the first detection frequency band by detecting a second signal that is received on the first detection frequency band;

detecting that the first detection frequency band is idle when the energy value is less than or equal to a preset value; and detecting that the first detection frequency band is not idle when the energy value is greater than the preset value.

10. An apparatus, comprising:
a memory configured to store instructions; and
one or more processors coupled to the memory and configured to execute the instructions to cause the apparatus to:
    obtain a preset transmit frequency band comprising a first transmit frequency bandwidth, wherein the preset transmit frequency band comprises N sub-frequency bands, and wherein a first sum of bandwidths of the N sub-frequency bands is equal to the first transmit frequency bandwidth;
    select, based on the preset transmit frequency band, an operating bandwidth of the apparatus, wherein the operating bandwidth is occupied by a waveform of a signal transmitted by the apparatus, wherein the operating bandwidth is greater than a second sum of bandwidths of N−1 of the N sub-frequency bands and is less than the first sum of bandwidths of the N sub-frequency bands, and wherein the operating bandwidth comprises a total bandwidth of the N−1 of the N sub-frequency bands and a portion of a bandwidth of one of the N sub-frequency bands; and
    transmit, on the operating bandwidth, a first signal.

11. The apparatus of claim 10, wherein a frequency domain range of the preset transmit frequency band is predefined.

12. The apparatus of claim 10, wherein distribution of the N sub-frequency bands in the preset transmit frequency band satisfies a predefined or pre-configured rule.

13. The apparatus of claim 10, wherein when executed by the one or more processors, the instructions further cause the apparatus to obtain the preset transmit frequency band by identifying a first detection frequency band in a plurality of detection frequency bands as the preset transmit frequency band, and wherein a first priority of the first detection frequency band is not lower than a second priority of a second detection frequency band in the plurality of detection frequency bands other than the first detection frequency band.

14. The apparatus of claim 10, wherein when executed by the one or more processors, the instructions further cause the apparatus to obtain the preset transmit frequency band by identifying a first detection frequency band in a plurality of detection frequency bands as the preset transmit frequency band, and wherein a first idle degree of the first detection frequency band is not lower than a second idle degree of a second detection frequency band in the plurality of detection frequency bands other than the first detection frequency band.

15. The apparatus of claim 10, wherein when executed by the one or more processors, the instructions further cause the apparatus to obtain the preset transmit frequency band by identifying a first detection frequency band in a plurality of detection frequency bands as the preset transmit frequency band, and wherein a first energy value of the first detection frequency band is not greater than a second energy value of a second detection frequency band in the plurality of detection frequency bands other than the first detection frequency band.

16. The apparatus of claim 15, wherein when executed by the one or more processors, the instructions further cause the apparatus to obtain the first energy value by detecting a second signal that is received on the first detection frequency band.

17. The apparatus of claim 10, wherein when executed by the one or more processors, the instructions further cause the apparatus to:
    detect whether a first detection frequency band is idle;
    select, when the first detection frequency band is idle, the first detection frequency band as the preset transmit frequency band; and
    select, when the first detection frequency band is not idle, the preset transmit frequency band as a second detection frequency band that is idle.

18. The apparatus of claim 17, wherein when executed by the one or more processors, the instructions further cause the apparatus to:
    obtain an energy value of the first detection frequency band by detecting a second signal that is received on the first detection frequency band;
    detect that the first detection frequency band is idle when the energy value is less than or equal to a preset value; and
    detect that the first detection frequency band is not idle when the energy value is greater than the preset value.

19. A non-transitory computer-readable storage medium comprising instructions that, when executed by one or more processors, cause an apparatus to:
    obtain a preset transmit frequency band comprising a first transmit frequency bandwidth, wherein the preset transmit frequency band comprises N sub-frequency bands, and wherein a first sum of bandwidths of the N sub-frequency bands is equal to the first transmit frequency bandwidth;
    select, based on the preset transmit frequency band, an operating bandwidth of the apparatus, wherein the operating bandwidth is occupied by a waveform of a signal transmitted by the apparatus, wherein the operating bandwidth is greater than a second sum of bandwidths of N−1 of the N sub-frequency bands and is less than the first sum of bandwidths of the N sub-frequency bands, and wherein the operating bandwidth comprises a total bandwidth of the N−1 of the N sub-frequency bands and a portion of a bandwidth of one of the N sub-frequency bands; and
    transmit, on the operating bandwidth, a first signal.

20. The non-transitory computer-readable storage medium of claim 19, wherein a frequency domain range of the preset transmit frequency band is predefined.

21. The non-transitory computer-readable storage medium of claim 19, wherein distribution of the N sub-frequency bands in the preset transmit frequency band satisfies a predefined or pre-configured rule.

* * * * *

UNITED STATES PATENT AND TRADEMARK OFFICE
CERTIFICATE OF CORRECTION

PATENT NO. : 12,313,734 B2  
APPLICATION NO. : 17/673159  
DATED : May 27, 2025  
INVENTOR(S) : Sida Song et al.

Page 1 of 1

It is certified that error appears in the above-identified patent and that said Letters Patent is hereby corrected as shown below:

On the Title Page

Page 2, (56) References Cited, Foreign Patent Documents: "CN 103477598 B 12/2013" should read "CN 103477598 B 11/2016".

Signed and Sealed this  
First Day of July, 2025

Coke Morgan Stewart  
*Acting Director of the United States Patent and Trademark Office*